US012418774B2

(12) United States Patent
Baker et al.

(10) Patent No.: US 12,418,774 B2
(45) Date of Patent: Sep. 16, 2025

(54) GESTURE-BASED LOAD CONTROL VIA WEARABLE DEVICES

(71) Applicant: Lutron Technology Company LLC, Coopersburg, PA (US)

(72) Inventors: Rhodes B. Baker, Bethlehem, PA (US); Erica L. Clymer, Northampton, PA (US); Galen Edgar Knode, Macungie, PA (US); Sanjeev Kumar, Harleysville, PA (US); John Nill, Emmaus, PA (US); Daniel L. Twaddell, Bethlehem, PA (US); Michael J. Zizza, Bethlehem, PA (US)

(73) Assignee: Lutron Technology Company LLC, Coopersburg, PA (US)

( * ) Notice: Subject to any disclaimer, the term of this patent is extended or adjusted under 35 U.S.C. 154(b) by 0 days.

(21) Appl. No.: 18/485,608

(22) Filed: Oct. 12, 2023

(65) Prior Publication Data

US 2024/0040338 A1 Feb. 1, 2024

Related U.S. Application Data

(63) Continuation of application No. 17/385,015, filed on Jul. 26, 2021, now Pat. No. 11,818,627, which is a
(Continued)

(51) Int. Cl.
*H04W 4/029* (2018.01)
*G05D 23/19* (2006.01)

(52) U.S. Cl.
CPC ........ *H04W 4/029* (2018.02); *G05D 23/1905* (2013.01)

(58) Field of Classification Search
None
See application file for complete search history.

(56) References Cited

U.S. PATENT DOCUMENTS 7,925,384 B2 4/2011 Huizenga et al.
7,940,167 B2 5/2011 Steiner et al.
(Continued)

FOREIGN PATENT DOCUMENTS

CN 102833910 A 12/2012

OTHER PUBLICATIONS

Estel et al., Feasibility of Bluetooth iBeacons for Indoor Localization, 2015, 12 pages.
(Continued)

*Primary Examiner* — Whitney Moore
(74) *Attorney, Agent, or Firm* — Michael S. Czarnecki; Glen R. Farbanish; Philip N. Smith

(57) ABSTRACT

A load control system may include control-target devices for controlling an amount of power provided to an electrical load. The control-target devices may be capable of controlling the amount of power provided to the electrical load based on control instructions. The control-target devices and/or the control-instructions may be determined based on a gesture performed by a user. The user may wear a wearable control device capable of measuring movements performed by the user and transmit digital messages that may be used to control an electrical load. The wearable control device may identify gestures performed by the user for controlling a control-target device and/or provide control instructions to the control-target device based on the identified gestures. A gesture may be associated with a scene that includes a configuration of one or more control devices in a load control system.

24 Claims, 14 Drawing Sheets

Related U.S. Application Data continuation of application No. 16/671,464, filed on Nov. 1, 2019, now Pat. No. 11,076,265, which is a continuation of application No. 15/011,263, filed on Jan. 29, 2016, now Pat. No. 10,484,827.

(60) Provisional application No. 62/110,277, filed on Jan. 30, 2015.

(56) References Cited

U.S. PATENT DOCUMENTS

| | | | |
|---|---|---|---|
| 8,009,042 | B2 | 8/2011 | Steiner et al. |
| 8,199,010 | B2 | 6/2012 | Sloan et al. |
| 8,228,184 | B2 | 7/2012 | Blakeley et al. |
| 8,570,221 | B2 | 10/2013 | Bao et al. |
| 8,659,230 | B2 | 2/2014 | Nanahara et al. |
| 8,933,876 | B2 | 1/2015 | Galor et al. |
| 9,201,499 | B1 | 12/2015 | Chang et al. |
| 9,232,610 | B2 | 1/2016 | Gritti |
| 9,345,115 | B2 | 5/2016 | Mohan |
| 2010/0245588 | A1 | 9/2010 | Waehner et al. |
| 2012/0268374 | A1 | 10/2012 | Heald |
| 2013/0154951 | A1 | 6/2013 | Laibowitz et al. |
| 2013/0234625 | A1 | 9/2013 | Kondo et al. |
| 2014/0031987 | A1 | 1/2014 | Ericsson et al. |
| 2014/0235269 | A1 | 8/2014 | Ericsson et al. |
| 2014/0267008 | A1 | 9/2014 | Jain et al. |
| 2014/0317577 | A1 | 10/2014 | Chen et al. |
| 2015/0026647 | A1 | 1/2015 | Park et al. |
| 2015/0102984 | A1 | 4/2015 | Wong et al. |
| 2015/0106770 | A1* | 4/2015 | Shah ................. G06F 3/017 |
| | | | 715/863 |
| 2015/0189068 | A1 | 7/2015 | Mohan et al. |
| 2015/0193111 | A1 | 7/2015 | Kauffmann et al. |
| 2015/0279051 | A1 | 10/2015 | Kovesi et al. |
| 2015/0346834 | A1 | 12/2015 | Martinez et al. |
| 2016/0028264 | A1 | 1/2016 | Bernhard et al. |
| 2016/0041618 | A1 | 2/2016 | Poupyrev et al. |
| 2016/0054023 | A1 | 2/2016 | Baker et al. |
| 2016/0056629 | A1 | 2/2016 | Baker et al. |
| 2016/0124579 | A1* | 5/2016 | Tokutake ............ G06F 3/0481 |
| | | | 345/156 |
| 2016/0266653 | A1 | 9/2016 | Liu et al. |
| 2016/0299570 | A1 | 10/2016 | Davydov |
| 2017/0277267 | A1 | 9/2017 | Liu et al. |

OTHER PUBLICATIONS

Bourgeous, Mike, "Gesture Like Light Control with Kinect", Available at: https://www.youtube.com/watch?v=x99gHQKVcg, retrieved on Jul. 8, 2013, Transcript of Video, May 15, 2011, 2 pages.

Bourgeous, Mike, "Gesture Like Light Control with Kinect", Available at: https://www.youtube.com/watch?v=x99gHQKVcg, retrieved on Jul. 8, 2013, Video, May 15, 2011.

* cited by examiner

GESTURE-BASED LOAD CONTROL VIA WEARABLE DEVICES

CROSS-REFERENCE TO RELATED APPLICATIONS

This application is a continuation of U.S. patent application Ser. No. 17/385,015, filed Jul. 26, 2021; which is a continuation of U.S. patent application Ser. No. 16/671,464, filed Nov. 1, 2019, now U.S. Pat. No. 11,076,265 issued Jul. 27, 2021; which is a continuation of U.S. patent application Ser. No. 15/011,263, filed Jan. 29, 2016, now U.S. Pat. No. 10,484,827 issued Nov. 19, 2019; which claims the benefit of U.S. Provisional Patent Application No. 62/110,277, filed Jan. 30, 2015, the entire disclosure of which is incorporated by reference herein.

BACKGROUND

A user environment, such as a residence or an office building for example, may be configured using various types of load control systems. Load control systems may include lighting systems; motorized window treatment systems; heating, ventilation, and air-conditioning (HVAC) systems; and/or the like. Most load control systems require the use of various devices for performing load control. Such load control systems may be embodied in a two-part load control system that includes a control-target device for directly controlling the electrical load and a control-source device, such as a remote control, for indirectly controlling the electrical load by sending instructions to the control-target device. Using such load control systems, a user may indirectly control an electrical load using a control-source device.

FIG. 1 illustrates an example of a prior art load control environment 102. As shown in FIG. 1, the load control environment 102 may include control-source devices and control-target devices. The control-target devices may include a lighting control device 104 (e.g., a dimmer switch, a ballast, or a light-emitting diode (LED) driver) for directly controlling an amount of power provided to lighting load 106, a motorized window treatment 112 for controlling the position of a covering material 114, a thermostat 120 for controlling an HVAC system, and a plug-in control device 122 (e.g., alternating current (AC) plug-in control device) for controlling the amount of power provided to a floor lamp 124, a table lamp, or the electrical load of another device that is plugged in to the plug-in control device 122. The control-source devices in the load control environment 102 may include a remote control device 116, a daylight sensor 108, an occupancy sensor 110, and/or a window sensor 126.

The control-source devices may communicate control instructions for controlling an electrical load to a control-target device via digital messages that may be transmitted via a wired or wireless communication, e.g., via radio-frequency (RF) signals. The remote control device 116 may transmit a digital message that indicates load control instructions based on the actuation of one or more buttons for controlling an electrical load. The daylight sensor 108 may transmit a digital message that indicates load control instructions based on a level of daylight sensed in the load control environment 102. The occupancy sensor 110 may transmit a digital message that indicates load control instructions based on an occupancy or vacancy condition sensed in the load control environment 102. The window sensor 126 may transmit a digital message that indicates load control instructions based on a level of daylight intensity sensed from outside of the load control environment 102.

The control-source devices in the load control system depicted in FIG. 1 may provide convenient ways for a user 118 to control an electrical load. These load control systems, however, require the user 118 to keep track of the location of one or more devices for controlling the system. A user's control may also be limited due to a predefined interface or the limited instructions provided by the control device.

Gesture recognition is a developing technology, which is being considered for use in load control systems to enable a convenient form of load control. Gesture recognition may be used to enable the user 118 to send instructions to a control-target device without the use of a remote control or a similar control-source device. In order to perform gesture-based load control, additional equipment, such as a camera for capturing images of a user, may need to be installed in the load control environment 102. There may be advantages to providing gesture control for an electrical load using other devices.

SUMMARY

A load control system may include one or more control devices for controlling an amount of power provided to an electrical load. A control device may be a central control device, a wearable control device, and/or a wireless communication device (e.g., a smartphone, tablet, laptop, etc.). A control device may be a control-source device and/or a control-target device. The control device may detect gestures performed by a user. For example, the control device may detect a gesture (e.g., data indicative of a gesture) performed by a user wearing a wearable control device for controlling a control-source and/or control-target device. Data indicative of a gesture may include the name and/or a label representing the gesture, and/or the data indicative of the gesture may include information (e.g., digital information) representing the position, direction, orientation, and/or speed of the wearable control device while the user is performing the gesture.

The control-source devices may transmit digital messages to the control-target devices for controlling the electrical load. As disclosed herein, control-target devices may be capable of controlling the electrical load (e.g., controlling the amount of power provided to the electrical load) based on control instructions received from a wearable control device or other control device. The control instructions may include load control instructions or another indication that causes the control-target device to determine load control instructions for controlling the electrical load. The control instructions may be determined based on the data indicative of the gesture performed by the user via the wearable control device.

The wearable control device may detect gestures performed by a user for controlling a control-target device. The wearable control device may determine control-target devices and/or control instructions based on the gestures and may provide control instructions to identified control-target devices based on the identified gestures. The wearable control device may transmit digital messages that indicate the gestures performed by the user or other data indicative of the gesture to other devices for determining control-target devices and/or control instructions based on the gestures. For example, the wearable control device may transmit digital messages that indicate the gestures performed by the user to a wireless communication device and/or a central control device.

The gestures may be identified based on a change in orientation of the wearable control device and/or a change in position of the wearable control device. To determine control-target devices and/or control instructions, the gestures may be compared against gestures that are stored in memory and associated with control-target devices and/or control instructions. A user may identify a control-target device to be controlled by performing an associated gesture. For example, the user may indicate a ballast to be controlled by pointing to the ballast or the ballast's lighting fixture. The user may also, or alternatively, identify a control-target device by selecting the control-target device on a visual display of the wearable control device and/or a wireless communication device (e.g., a smartphone, a tablet, a laptop, etc.). When the control-target device has been determined, the user may identify the control instructions for controlling the control-target device by performing an associated gesture. For example, the user may raise an arm to send instructions to the identified ballast to increase the power provided to the lighting fixture.

A gesture may be associated with a scene (e.g., a preset) that includes a predefined configuration of one or more control devices in a load control system. To configure the control devices according to the scene, the user may perform the associated gesture. The gesture may indicate the control devices for being controlled and/or the control instructions for being sent to each control device.

The user may engage the wearable control device, or another device in the load control system, for enabling load control based on gestures performed by the user. The devices may be engaged by the user performing an engage gesture, actuating a button on the wearable control device, or actuating a button on the wireless communication device. The user may disengage the wearable control device, or another device in the load control system, for disabling load control based on gestures performed by the user. The disengage gesture may cause the wearable control device to be unable to identify control instructions and/or control a control-target device until the user re-engages the wearable control device, or another device in the load control system, for transmitting control instructions.

The user may program the wearable control device, a wireless communication device, and/or a central control device to identify a gesture. The user may perform a programming gesture that may be identified by the wearable control device or the central control device to trigger a programming mode. When the programming mode is activated, the user may program the wearable control device, a wireless communication device, and/or the central control device to identify a gesture. The user may perform a gesture and associate that gesture with a control-target device and/or control instructions. The wearable control device, the wireless communication device, and/or the central control device may store the association such that the gesture may be identified for load control or control of the wearable control device.

The central control device may learn to automate control of the load control system based on repeated gestures performed by the user in a location. The central control device may store gestures performed by a user that cause a change in the status of an electrical load or a control-target device. When the central control device identifies that the user has performed the gesture in the same location a predetermined number of times (e.g., at least three times) for changing the status of the electrical load or the control-target device, the central control device may automate the control of the when the user is within the location. The central control device may receive feedback of whether the user likes the automated control and may modify the automated control based on the feedback.

DETAILED DESCRIPTION

Figure 1:
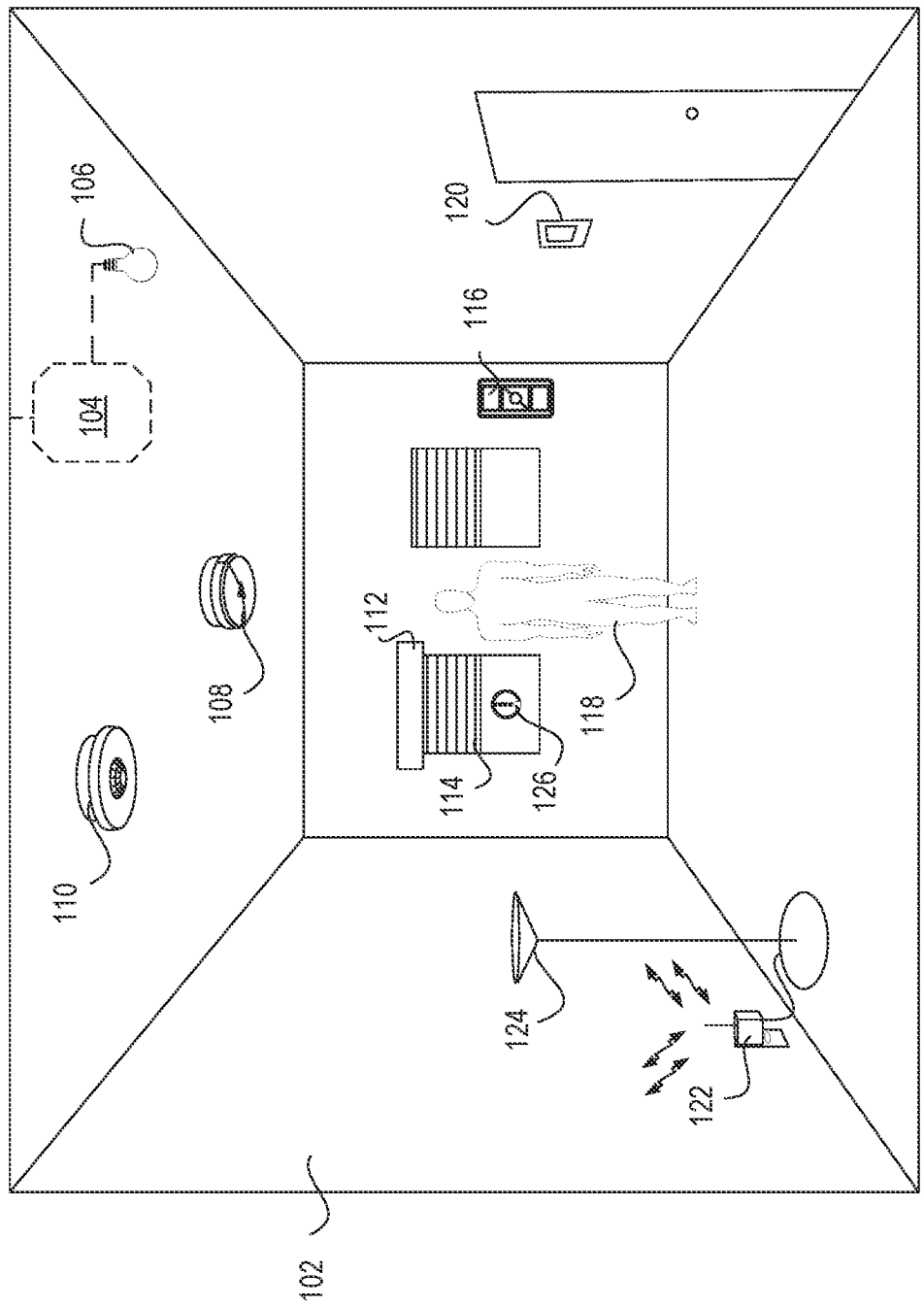
FIG. 1 depicts an example prior art environment for controlling an electrical load.
Figure 2:
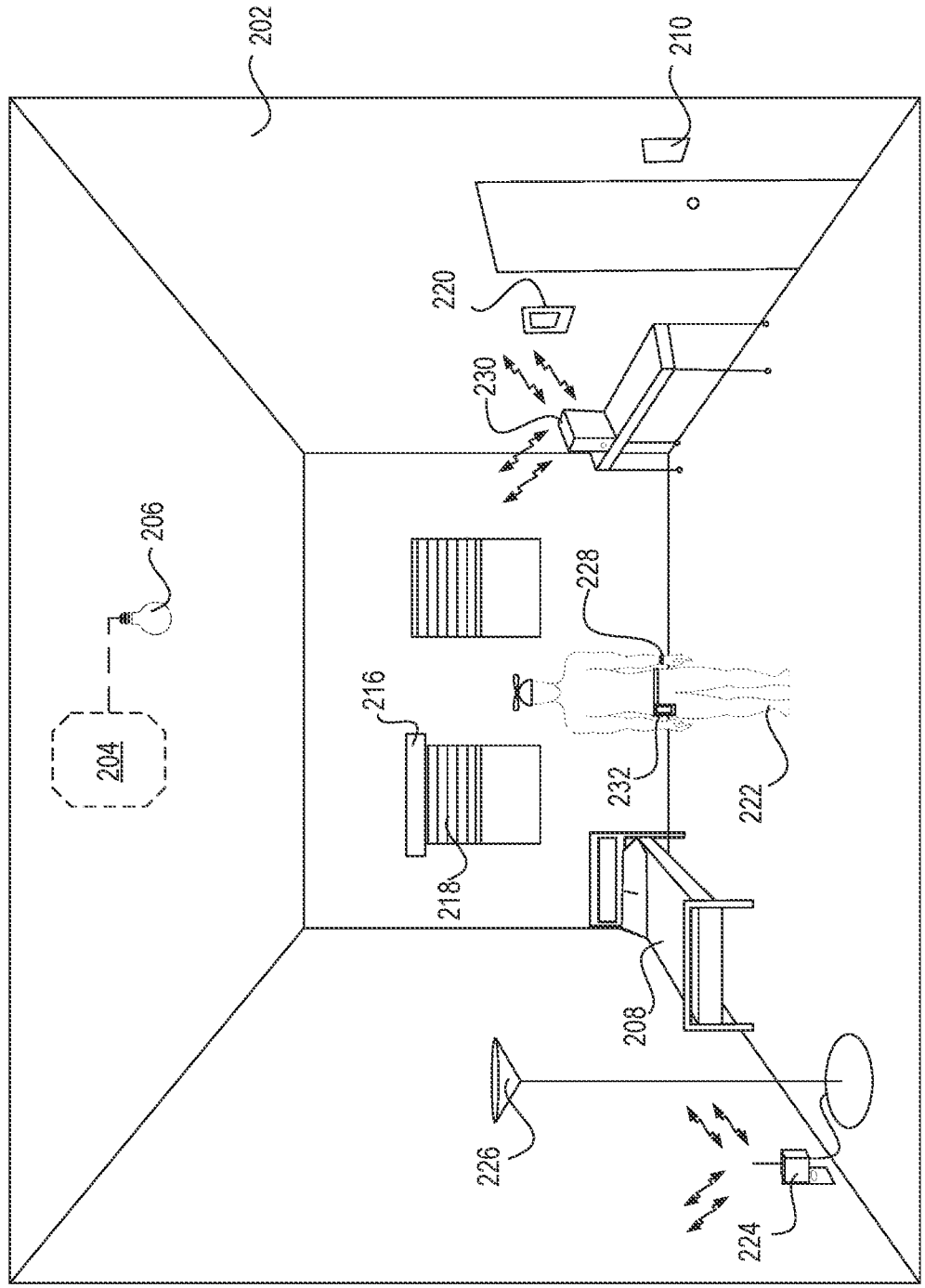
FIG. 2 depicts an example environment for controlling devices using gesture control.

FIG. 2 depicts an example load control environment 202 (e.g., a room in an office building or residence) for controlling devices using wearable control devices. As shown in FIG. 2, the load control environment 202 may be installed with one or more control devices for controlling the electrical loads within the load control environment 202 to control one or more characteristics of the load control environment (e.g., the amount of artificial and/or natural daylight in the room, the temperature in the room, the status of an electrical device, etc.). The control device may detect gestures performed by a user 222. For example, the control device may detect a gesture (e.g., data indicative of a gesture) performed by the user 222 wearing a wearable control device 228 for controlling a control-target device. The data indicative of the gesture may include the name and/or a label representing the gesture, and/or the data indicative of the gesture may include information (e.g., digital information) representing the position, direction, orientation, and/or speed of the wearable control device 228 while the user 222 is performing the gesture.

Control devices may be implemented to enable control of an electrical load based on gestures performed by a user. For example, control devices may be implemented to enable control of an electrical load based on data indicative of gestures performed by a user. Each control device may be a control-source device capable of transmitting digital messages, e.g., wirelessly or via a wired communication, for controlling the amount of power provided to an electrical load. A control device may be a control-target device capable of receiving the digital messages and directly controlling the electrical load (e.g., directly controlling an amount of power provided to the electrical load) based on the information in the digital messages. A control device may be a control-source device and a control-target device. Example control devices may include a lighting control device 204 (e.g., a dimmer switch, a switching device, a ballast, or an LED driver) for controlling the amount of power provided to a lamp 206; a motorized window treatment 216 for controlling the position of a covering material 218 via an electrical motor; a temperature control device 220 (e.g., thermostat) for controlling a heating, ventilation, and air-conditioning (HVAC) system; and/or a plug-in control device 224 for controlling the amount of power provided to an electrical load connected to the plug-in control device 224 (e.g., a floor lamp 226 or a table lamp).

Each of the control devices may control one or more characteristics of the load control environment 202 (e.g., by controlling the amount of power provided to an electrical load) based on received digital messages. A wearable control device 228 may be a control device capable of transmitting digital messages for controlling one or more characteristics of the load control environment 202. The wearable control device 228 may be a device capable of being worn by the user 222 and may act as a control-source device for communicating digital messages for controlling one or more electrical loads of the load control environment 202. The wearable control device 228 may detect one or more gestures performed by the user for controlling one or more electrical loads. Gestures may be identified measurements performed by the wearable control device 228 when the user 222 performs movements. As shown in FIG. 2, the wearable control device 228 may be an armband (e.g., a smart watch, such as a SAMSUNG® GALAXY GEAR™ watch or an APPLE® watch, a FITBIT® armband, or other device capable of being worn on the arm of the user 222). In other examples (not shown in FIG. 2), the wearable control device 228 may include a ring, glasses (e.g., GOOGLE® GLASS™), a headset (e.g., BLUETOOTH® headset), clothing (e.g., shirts, gloves, etc.), or other wearable control device capable of detecting gestures performed by the user 222.

The wearable control device 228 may detect gestures performed by the user 222 and may transmit digital messages to one or more control devices (e.g., central control devices, wearable control devices, wireless communication devices, control-source devices, and/or control-target devices). The wearable control device 228 may detect the gestures performed by the user 222 and the gestures may be used to determine one or more control-target devices and/or load control instructions for controlling an electrical load via the one or more control-target devices. For example, the control-target devices and/or load control instructions may be determined at the wearable control device 228 based on the gesture performed by the user 222. In another example, the wearable control device 228 may transmit a digital message that indicates the gesture performed by the user, which may be used by another device to determine the control-target devices and/or load control instructions. The control-target devices and/or load control instructions may be included in the digital messages transmitted directly from the wearable control device 228 to the control-target devices. The wearable control device 228 may communicate with the control-target devices via wired or wireless communications, e.g., via radio-frequency (RF) signals.

The wearable control device 228 may send digital messages to and/or receive digital messages from one or more intermediate devices capable of communicating with the wearable control device 228 and other control devices in the load control environment 202. For example, the wearable control device 228 may communicate with a central control device 230 and/or a wireless communication device 232 (e.g., a cellular phone, a tablet, a laptop, or other computing device capable of performing communications on a wireless network). The central control device 230 and/or a wireless communication device 232 may be control devices capable of receiving digital messages from the wearable control device 228 and/or transmitting digital messages to one or more control-target devices for controlling an electrical load. The central control device 230 may be a local computing device located in the load control environment or a remote computing device. The central control device 230 and the wireless communication device 232 may communicate with one another (e.g., via a wireless communication network, such as a cellular network, WI-FI® network, etc.). For example, the wearable control device 228 may communicate digital messages to the central control device 230 via the wireless communication device 232. The wearable control device 228 may include one or more communication circuits capable of communicating with the central control device 230 and/or the wireless communication device 232. The communication circuits may be capable of communicating via one or more communication protocols. For example the communication circuits may be capable of communicating with the central control device 230 and/or the wireless communication device 232 via wireless signals (e.g., RF signals), such as WI-FI® signals; WIMAX® signals; BLUETOOTH® signals; near field communication (NFC) signals; proprietary communication signals, such as CLEAR CONNECT™; ZIGBEE® signals, Z-WAVE signals, and/or the like. Each communication circuit may be capable of communicating on different protocols and/or frequencies. For example, different communication circuits may enable the wireless communication device 232 to communicate with the wearable control device 228 via one protocol or frequency, and with the central control device 230 or control-target devices via another protocol or frequency.

A control device may be a central control device, such as central control device 230. The central control device 230 may be configured to monitor the status of electrical loads and/or control-target devices. The central control device 230 may receive digital messages from control-target devices capable of two-way communication. The communications may be transmitted from the control-target devices via wired and/or wireless signals. In order to perform wireless communications, the control-target devices may include a communication circuit (e.g., transmitter or transceiver) capable of performing RF communications.

The digital messages may also be sent to the central control device 230 in response to a status request message from the central control device 230, a status request message from the wireless communication device 232 or the wearable control device 228, a change in the status of the control-target device (e.g., turning on a lamp 206, 226, changing the dimming intensity of the lamp 206, 226, changing the level of the covering material 218, changing the temperature on the temperature control device 220), based on the location of the user 222 (e.g., when the user 222 enters the load control environment 202, when the user 222 comes within a predefined distance of a control-target device, etc.) and/or after a predetermined period of time (e.g., an hour, a day, etc.) has elapsed. The status request messages may be triggered at the central control device 230 based on a digital message received from the wireless communication device 232 or the wearable control device 228. The digital messages that report the status of the control-target devices may indicate whether power is being provided to an electrical load (e.g., lamps 206, 226) and/or the current status of the electrical load (e.g., whether the lamps 206, 226 is on or off, the dimming intensity of the lamp 206, 226, the position of the covering material 218, the temperature at which the HVAC system is being controlled by the temperature control device 220, etc.).

The wearable control device 228 may perform an association procedure with other devices in the load control system (e.g., control devices, the central control device 230, the wireless communication device 232, etc.). The wearable control device 228 may enter an association mode for transmitting digital messages for associating with one or more other devices. The wearable control device 228 may enter the association mode upon actuation of one or more buttons on the wearable control device 228 and/or performance of an association gesture. The other devices in the load control system (e.g., control devices, the central control device 230, the wireless communication device 232, etc.) may also enter an association mode for being associated with the wearable control device 228 or otherwise recognize association messages transmitted from the wearable control device 228. The other devices in the load control system may enter an association mode upon a user actuation of one or more buttons on the devices. During the association procedure, the wearable control device 228 may transmit digital messages that include a unique identifier (e.g., a serial number) of the wearable control device 228. The digital messages may be received by other devices in the load control system and the devices may store the unique identifier of the wearable control device 228, such that subsequent digital messages received from the wearable control device 228 may be identified.

The wearable control device 228 may transmit digital messages that include the unique identifier of the wearable control device (e.g., a serial number) for controlling an electrical load. The devices that are associated with the wearable control device 228 may respond to the digital messages when they identify the serial number of the wearable control device 228. For example, a control-target device may execute load control instructions indicated in a digital message from the wearable control device 228 to control an electrical load. The wearable control device 228 may transmit digital messages via broadcast messages or directly to control-target devices.

The digital messages from the wearable control device 228 may include information that may identify one or more control-target devices. For example, the digital messages from the wearable control device 228 may include a unique identifier of one or more control-target devices, a type of control-target device (e.g., lighting control devices, motorized window treatments, etc.), and/or a zone or location of the control-target devices. The wireless communication device 232 and/or the central control device 230 may receive the digital messages from the wearable control device 228 and may communicate digital messages to the identified control-target devices for controlling an electrical load. The wireless communication device 232 and/or the central control device 230 may be used to determine the control-target devices and/or the load control instructions for controlling the electrical loads based on the gestures indicated by the wearable control device 228. The wireless communication device 232 and/or the central control device 230 may determine the load control instructions locally or may forward the indicated gestures to a remote computing device that may determine and return the control-target devices and/or the load control instructions for being transmitted to the control-target devices.

The gesture performed by the user 222 may be identified by the wearable control device 228 and may be compared (e.g., at the wearable control device 228, the wireless communication device 232, the central control device 230, or another device) to movements associated with one or more load control instructions and/or control-target devices. The association of gestures to the load control instructions and/or control-target devices may be stored in a datastore (e.g., database). The datastore may be stored in memory at the wearable control device 228, the wireless communication device 232, and/or the central control device 230.

The wearable control device 228 may include a gyroscope and/or an accelerometer for identifying the gestures performed by the user 222. The gyroscope may identify an orientation of the wearable control device 228. The accelerometer may identify an acceleration of the wearable control device 228. The accelerometer may be used to detect magnitude and direction of the acceleration of the wearable control device 228, such as in the form of a vector, an orientation of the wearable control device 228, and/or vibrations of the wearable control device 228.

The wearable control device 228 may be an armband, ring, glasses, a headset, clothing (e.g., shirts, gloves, etc.), or other wearable control device capable of detecting gestures performed by the user 222. The wearable control device 228 may detect a change in orientation, direction, and/or speed. The wearable control device 228 may include multiple sensors for detecting gestures performed by a user. For example, the wearable control device 228 may be a shirt or gloves that may include a sensor for detecting different gestures performed by different arms, hands, and/or fingers of the user 222.

The orientation of the wearable control device 228 may be used to identify a control-target device and/or load control instructions for controlling an electrical load via the control-target device. The wearable control device 228 may be an armband capable of detecting the user 222 rotating an arm or wrist. For example, the user 222 may rotate an arm or wrist to mimic the movement of turning a knob (e.g., a doorknob) or the movement of a lighting control device 204 (e.g., a dimmer switch). The wearable control device 228 may detect the rotation of the arm of the user 222 or the wrist of the user 222 and/or an amount of the rotation, which may indicate an amount of change to a dimming level of a lighting load. The wearable control device 228 may sense sudden movements by the user 222, such as a twitch left or right, to control a control-target device. The wearable control device 228 may detect when the user 222 changes the orientation of the wearable control device 228 by a predetermined distance. For example, the wearable control device may identify when the user 222 rotates the wearable control device 228 a predetermined distance. A change in the orientation of the wearable control device 228 by a predetermined distance may identify a control-target device and/or load control instructions. The wearable control device 228 may detect when the user 222 changes the orientation of the wearable control device 228 at a predetermined speed. For example, the wearable control device may identify when the user 222 rotates the wearable control device 228 a predetermined speed. A change in the orientation of the wearable control device 228 at a predetermined speed may identify a control-target device and/or load control instructions. The orientation of the wearable control device 228 may be changed a number of times to identify different control-target devices and/or control instructions.

The orientation of the wearable control device 228 may be used to control an intensity (e.g., a dimming intensity) of the lamps 206, 226, a position of the covering material 218, and/or a temperature of the load control environment (e.g., as measured by the temperature control device 220). The orientation of the wearable control device 228 may be used to turn an electrical load on or off. The orientation of the wearable control device 228 may be changed a number of times to identify different zones and/or scenes (e.g., presets) for setting control devices to a predetermined level. A preset may be a predefined group of one or more load control devices (e.g., control-target devices) and control instructions that identify a predetermined level for the electrical load (e.g., dimming level for lighting load, shade position for electrical shades, set point temperature for HVAC system, etc.). A scene may be a predefined configuration of one or more control devices in the load control environment 202 (e.g., a movie scene, a bedtime scene, a home or away scene, etc.). For example, in a movie scene or a bedtime scene, the covering material 218 may be closed and/or the intensities of the lamps 206, 226 may be adjusted to a low dimming level (e.g., 5%) or turned off. In the bedtime scene, the temperature control device 220 may also increase or decrease the temperature to a predetermined level (e.g., depending on the time of year). An away scene may control one or more control devices for when the user is away from the load control environment. For example, in the away scene, the lamps 206, 226 may be turned off and the temperature of the temperature control device 220 may be increased or decreased (e.g., depending on the time of year). A home scene may control one or more control devices for when the user is occupying the load control environment. For example, in the home scene, the lamps 206, 226 may be turned on and the temperature of the temperature control device 220 may be increased or decreased (e.g., depending on the time of year). The user 222 may shake the wearable control device 228 to reset the orientation of the wearable control device or initialize the wearable control device 228 (e.g., set the orientation and/or other parameters for measuring gestures to zero).

The scene configuration may be preconfigured based on user input. One or more control devices may be associated with each scene and may be sent control instructions for controlling an electrical load according to a predetermined configuration. For an away scene, for example, the intensities of the lamps 206, 226 may be dimmed to a predetermined level or the lamps 206, 226 may be turned off, the motorized window treatment 216 may adjust the position of the covering material 218, and/or the temperature of the temperature control device 220 may be increased (e.g., in the summer) or decreased (e.g., in the winter) to reduce power consumption while the user is away. For example, the motorized window treatment 216 may lower the position of the covering material 218 as part of the away scene while the user is away.

The orientation of the wearable control device 228 may be used to determine an angle of the arm of the user 222 when raised or lowered (e.g., from an initial starting point of zero). The different angles at which the user 222 positions an arm may indicate different control-target devices and/or control instructions. For example, the user 222 may position an arm at different angles to identify different zones or scenes for performing load control. The distance the user 222 raises or lowers an arm may also, or alternatively, be used to indicate different control-target devices and/or control instructions.

If the wearable control device 228 is a ring, the ring may determine a position of a finger of the user 222. For example, the position of the thumb of the user may be used to indicate different control-target devices and/or control instructions. The position of the thumb relative to other fingers on the hand of the user 222 may be identified. The different positions of the user's finger may indicate different scenes (e.g., presets) for controlling one or more control-target devices. The orientation of the ring may also be used to control an electrical load. For example, a dimming level for the lamp 206, 226 or a level of the covering material 218 for the motorized window treatment 216 may be adjusted by changing the orientation of the ring (e.g., rotating the ring on the finger of the user 222).

The user 222 may identify the control-target device to which the load control instructions may be sent by performing a gesture or otherwise identifying the control-target device. For example, the user 222 may identify a control-target device by pointing in the direction of the control-target device (e.g., using an armband, shirt, ring, or other wearable device capable if identifying a vector pointing in the direction of a control device) or facing the control-target device (e.g., using an armband, shirt, glasses, or other wearable device capable if identifying a direction the user 222 is facing). The wearable control device 228 may identify a vector in the direction of a control-target device and the direction of the vector may be compared (e.g., at the wearable control device 228, the wireless communication device 232, the central control device 230, or another computing device) against a mapping of the load control environment 202 or the known location of a control-target device to identify one or more control-target devices. In another example, each control-target device, or type of control-target devices for executing load control instructions, may be identified with a specific gesture performed by the user 222. The wearable control device 228 may identify the gesture performed by the user and may determine the control-target device, or communicate the gesture to another device (e.g., the wireless communication device 232 or the central control device 230) for determining the control-target device based on the gesture.

The control-target devices may be identified by zone. A user may perform a gesture that identifies a zone that includes one or more control-target devices. The wearable control device 228 may identify a vector in the direction of a zone and the direction of the vector may be compared (e.g., at the wearable control device 228, the wireless communication device 232, the central control device 230, or another computing device) against a mapping of the load control environment 202 or the known location of a zone to identify one or more control-target devices in the zone.

The control-target device may be identified using another device. For example, the user 222 may select one or more control-target devices or zones on the wireless communication device 232. The user 222 may perform a gesture for controlling the identified control-target device. For example, the user 222 may select the lamp 206 and/or lighting control device 204 on the wireless communication device 232 and may raise the arm on which the wearable control device 228 is being worn to increase the intensity of the lamp 206.

The user 222 may perform a gesture to identify the control-target device that the user 222 would like to control and perform another gesture to send load control instructions for controlling the identified control-target device. For example, the user 222 may point an arm in the direction of the lighting control device 204 and/or the lamp 206 to indicate the lighting control device 204 as the control-target device that the user 222 would like to control and the user 222 may raise an arm to increase the intensity of the lamp 206. The intensity of the lamp 206 may be increased by a predetermined amount, such as twenty percent, for each time the user 222 raises the arm or the amount of increase may correspond to the distance the user 222's arm travels from a starting point to an ending point. In another example, the dimming intensity may be increased for each period of time, e.g., each second, the user 222 holds the gesture.

The gesture performed by the user may identify the control-target devices that the user 222 would like to control and indicate the control instructions to be sent to the control-target devices. For example, the wearable control device 228 may identify a gesture performed by the user 222 that identifies the lighting control device 204, the plug-in control device 224, and the motorized window treatment 216 and send control instructions to each of the control-target devices 204, 224, 216 for controlling the corresponding electrical load. The user 222 may lower an arm to instruct the lighting control device 204 to decrease the intensity of the lamp 206, instruct the plug-in control device 224 to decrease the intensity of the floor lamp 226, and/or instruct the motorized window treatment 216 to lower the covering material 218. The gesture may correspond to a scene that causes each of the control-target devices 204, 224, 246 to be set to a predetermined level. In another example, the dimming level of the lighting control device 204 and the plug-in control device 224 may be decreased by a predetermined amount (e.g., twenty percent), and the position of the covering material 218 may be lowered by a predetermined amount (e.g., twenty percent), when the user 222 lowers the arm. The amount of change may alternatively correspond to the distance the arm of the user 222 travels from a starting point to an ending point. In another example, the intensity of the lamp 206, 226 may be decreased and the position of the covering material 218 may be lowered for each period of time, e.g., each second, the user 222 holds the gesture.

The wearable control device 228 may sense one or more parameters (e.g., biometric data) that define the physical condition (e.g., behavior, movement, comfort, and/or health) of the user 222. For example, the wearable control device 228 may detect the heart rate of the user 222. The heart rate information of the user 222 may be detected in the fingers (e.g., using sensors in a ring or gloves) or the wrist (e.g., using sensors in an armband or shirt) of the user 222. The heart rate information of the user 222 may be used to perform load control in the load control environment 202. For example, the heart rate information may be used to automatically sense when user is sleeping and may control the electrical load of one or more control-target devices (e.g., setting a bedtime scene to turn off the lamp 206, 226, increase or decrease the temperature on the temperature control device 220, lower the covering material 218, turn off a television that may be plugged in to the plug-in control device 224, etc.). The heart rate information may be used to automatically sense when user wakes up, sits up in a bed 208, or gets out of the bed 208 and may control the electrical load of one or more control-target devices (e.g., setting a wakeup scene to turn on the lamp 206, 226 and set to a predetermined dimming level, increase or decrease the temperature on the temperature control device 220, raise the covering material 218 to a predetermined level, etc.). When the heart rate information indicates that the user 222 is below a predetermined threshold and/or the time of day is after a predetermined time, the user 222 may automatically be determined to be asleep. When the heart rate information indicates that the user 222 is above a predetermined threshold and/or the time of day is after a predetermined time, the user 222 may automatically be determined to be awake.

The predetermined heart rate threshold may be different among different users. The predetermined hear rate threshold for determining whether the user 222 is asleep may be based on the user 222's average heart rate during daytime hours (e.g., a predetermined number of daytime hours). As the heart rate of the user 222 may rise above the predetermined heart rate threshold while the user is asleep, the user 222 may be assumed to be asleep between predetermined hours once the heart rate of the user 222 falls below the predetermined threshold. For example, the user 222 may be determined (e.g., by the wireless communication device 232, the system control device 230, or other device) to be asleep when the heart rate of the user 222 drops below a predetermined threshold after 9:00 PM and the user 222 may be determined (e.g., by the wireless communication device 232, the central control device 230, or other device) to be asleep until the heart rate of the user 222 rises above a predetermined threshold after 6:00 AM.

One or more control devices may be used to wake up the user 222 at a predetermined time. For example, a wakeup scene may be used to wake up the user 222 at a predetermined time in the morning. The wakeup scene may turn on the lamp 206, 226 to a predetermined dimming intensity and/or raise the covering material 218 to a predetermined level. The wakeup scene may also, or alternatively, turn on a television or music to a predetermined volume level (e.g., using the plug-in control device 224 or the wireless communication device 232).

The wearable control device 228 may identify the user 222. For example, the unique identifier (e.g., serial number) of the wearable control device 228 may be associated with one or more users and the association may be stored (e.g., in a database) at the control devices, the wireless communication device 232, and/or the central control device 230. When the wearable control device 228 is shared by multiple users, the wearable control device 228 may transmit a different user identifier for each user. The wearable control device 228 may identify the user 222 based on a user identification action, such as an actuation of one or more buttons on the wearable control device 228 and/or one or more gestures performed by the user 222. The wearable control device may also include a biometric sensor (e.g., fingerprint scanner, eye scanner, etc.) for identifying the user 222. After the user 222 is identified, the wearable control device 228 may transmit digital messages that also identify the user 222.

The unique identifier transmitted by the wearable control device 228 may be recognized (e.g., by the central control device 230) for enabling control of various control devices in the load control environment 202. The unique identifier may be used to access a gesture datastore (e.g., database) associated with the unique identifier. The gesture datastore may include an indication of identified gestures and associated control-target devices and/or control instructions. The wearable control device 228 may send the unique identifier to the central control device 230 and the central control device 230 may permit access to the gesture datastore (e.g., stored locally or at a remote location) for control of the electrical loads in the load control environment 202. The user identifier may be recognized (e.g., by other central control devices) at other locations (e.g., at a residence, office, hotel, other rooms or floors in the same building, etc.) for enabling control of various control devices at different locations by the user 222 using the same gestures or other commands used in the load control environment 202. The user 222 may use the same gestures or other commands to control the same types of control devices. For example, the user 222 may use the same gestures to control lighting control devices in different locations.

The wearable control device 228 may receive and identify audio commands for controlling control-target devices. A microphone in the wearable control device 228 may record audio or capture a live audio stream. The audio commands may also be received by another device, such as the wireless communication device 232, for example. The audio commands may be paired with gestures to determine a control device and/or control instructions for controlling the control device. For example, the user 222 may point to the lighting control device 204 or the lamp 206 and say "turn on" to command the lighting control device 204 to turn on the lamp 206. The audio commands may also be used to identify the device. The user 222 may say "kitchen lights" to identify the lamps in the kitchen and may raise an arm to increase the dimming level of the identified kitchen lamps. The voice command may identify a location, zone, and/or lighting load for being controlled by the wearable control device 228. The audio commands may also be stored in the gesture datastore and may be accessed at different locations.

The user 222 may engage the wearable control device 228 for identifying commands for transmitting digital messages to control an electrical load. The wearable control device 228 may be engaged by actuating a button on the wearable control device, actuating a button on the wireless communication device 232, reciting a voice command that is recognizable to the wearable control device 228, and/or performing an engage gesture. The user 222 may engage the wearable control device 228 by shaking the wearable control device or performing another distinctive movement that is recognizable by the wearable control device 228. The engaged wearable control device 228 may enter a mode for identifying gestures performed by the user 222 for controlling an electrical load.

The wearable control device 228 may indicate to the user 222 that the wearable control device 228 is engaged. For example, the wearable control device 228 may flash an indicator light after the wearable control device 228 is engaged. The wearable control device 228 may indicate that it is engaged by sending instructions to a control device. For example, the wearable control device 228 may instruct the lighting control device 204 to flash the lamp 206, instruct the motorized window treatment 216 to adjust the covering material 218 (e.g., jog the covering material 218 up or down by a predetermined amount, wiggle the covering material 218, or tilt slats of the covering material 218), and/or instruct the plug-in control device 224 to flash the floor lamp 226 or turn on or off another device that is plugged in to the plug-in control device 224.

The engaged wearable control device 228 may identify one or more gestures performed by the user 222. The period of time for which the wearable control device 228 is engaged may be a pre-determined period of time or until the user 222 disengages the wearable control device 228. The user 222 may re-engage the wearable control device 228 after each identified gesture or the user 222 may perform consecutive gestures for a period of time without re-engaging the wearable control device 228. The user 222 may disengage the wearable control device 228 by performing a disengage gesture that may cause the wearable control device 228 to be unable to control a control device until the user 222 re-engages the wearable control device 228.

The wearable control device 228 may be used to identify the location (e.g., room, floor, building, or other space) of the user 222. The wearable control device 228 may include a communication circuit capable of communicating via NFC signals. The load control environment 202 may include an NFC device 210 capable of detecting the NFC signals transmitted by the wearable control device 228. For example, the NFC device 210 may comprise a passive NFC tag, such as a radio-frequency identification (RFID) tag, or may comprise an active NFC device (e.g., an NFC sensor). The user 222 may move the wearable control device 228 in close proximity to the NFC device 210, for example, by touching the wearable control device 228 to the NFC device 210 or by waving the wearable control device 228 close to the NFC device 210, to enable load control in the load control environment 202 using the wearable control device 228. The wearable control device 228 may receive a unique identifier from the NFC device 210, and may transmit the unique identifier to the central control device 230 to indicate that the user 222 is located in the load control environment 202. In addition, the NFC device 210 may receive a unique identifier from the wearable control device 228 and may communicate the unique identifier to the central control device 230 to indicate that the user 222 is located in the load control environment 202. The central control device 230 may listen for digital messages from the wearable control device 228 upon receiving the unique identifier.

The location of the user 222 may be paired with a gesture to perform load control. For example, the user 222 may wave the wearable control device 228 in an upward direction in front of the NFC device 210 to turn on or increase the dimming intensity of the lamps 206, 226 in the load control environment 202. The user 222 may wave the wearable control device 228 in an upward direction to also, or alternatively, increase the level of the covering material 218 and/or increase the temperature of the temperature control device 220. The user 222 may wave the wearable control device 228 in a downward direction in front of the NFC device 210 to turn off or decrease the dimming intensity of the lighting loads 206, 226, decrease the level of the covering material 218, and/or decrease the temperature of the temperature control device 220. The user 222 may wave the wearable control device 228 in a certain direction in front of the NFC sensor to engage a scene (e.g., movie scene, bedtime scene, etc.) in the load control environment.

The control-target devices of the load control environment 202 may include NFC communication circuits capable of detecting the NFC signals transmitted by the wearable control device 228. The wearable control device 228 may touch or be waved in front of a control-target device to activate the control-target device for being controlled by the wearable control device 228. Within a period of time from the activation of the control-target device, the user 222 may perform a recognized gesture for controlling the activated control-target device. The wearable control device 228 touching or being waved in front of a control-target device may also be used to identify the location of the user within the load control environment 202. The user 222 may use the wearable control device 228 to control devices within a zone or predetermined distance from the NFC device 210 (or control-target device having an NFC communication circuit) that was activated by the user 222.

The wearable control device 228 may have a global positioning system (GPS) circuit and may thus be GPS enabled. The location of the wearable control device 228 may be determined from the GPS circuit. The location determined by the GPS circuit of the wearable control device 228 may indicate the location of the user 222. The location determined by the GPS circuit of the wearable control device 228 may be communicated to the wireless communication device 232 and/or the central control device 230. When the user 222 is determined (e.g., by the wearable control device 228, the wireless communication device 232, and/or the central control device 230) to be within a predetermined location (e.g., room, portion of a room, floor, portion of a floor, group of floors, building, etc.), the wearable control device 228 may be used to transmit control instructions to control-target devices in the location. The location determined by the GPS circuit of the wearable control device 228 may also, or alternatively, be used to determine whether the user 222 is within a predefined distance of one or more control-target devices. The predetermined location may be a distance (e.g., three feet) from the control-target device. When the user 222 is determined (e.g., by the wearable control device 228, the wireless communication device 232, and/or the central control device 230) to be within the predetermined distance of a control-target device, or an area comprising an electrical load controlled by the control-target device, the wearable control device 228 may be used to transmit control instructions to the control-target device. For example, when the user 222 is approaching the load control environment 202 (e.g., which may be a home, business, or space within the home or business, such as a room or portion of a room within the home or business), and the user 222 reaches a predetermined distance from the load control environment 202, one or more control-target devices may be controlled or set to a preconfigured setting or scene (e.g., preset). Similarly, when the user 222 is leaving the load control environment 202, and the user 222 reaches a predetermined distance from the load control environment 202, one or more control-target devices may be controlled or set to a preconfigured setting or scene (e.g., preset).

The wearable control device 228 may associate (e.g., pair) with a device (e.g., the wireless communication device 232, such as a smartphone, tablet, laptop, etc.). For example, the wearable control device 228 may pair with a wireless communication device 232 positioned on, or near, the user 222. The wearable control device 228 may include a communication circuit capable of pairing with the wireless communication device 232 and/or wirelessly communicating with the wireless communication device 232. The wearable control device 228 may pair with a wireless communication device 232 for determining the location of the user 222. The wireless communication device 232 may provide a reference point. For example, the wireless communication device 232 may provide a reference point to assist in determining the location and/or movement of the wearable control device 228.

The wireless communication device 232 may be GPS enabled and may be used to indicate the location of the user 222 and/or the location of the wearable control device 228 (e.g., the location of the wearable control device 228 with respect to the wireless communication device 232). For example, the direction the user 222 is moving and/or the direction the wearable control device 228 is moving may be determined based on the wireless communication device 232. The wireless communication device 232 and/or the wearable control device 228 may measure a signal strength received (e.g., a received signal strength indicator (RSSI)) and/or a signal strength transmitted from one device and another device. For example, the wearable control device 228 may determine that it is being moved away from and/or moved toward the wireless communication device 232 because a signal (e.g., an NFC signal, BLUETOOTH signal, WI-FI® signal, cellular signal, etc.) between the wearable control device 228 and wireless communication device 232 becomes less strong and/or stronger, respectively. The direction the wireless communication device 232 is moving may be determined based on the direction of the GPS coordinates of the wireless communication device 232 and/or the strength of a wireless communication signal (e.g., an NFC signal, BLUETOOTH signal, WI-FI® signal, cellular signal, etc.) of the wireless communication device 232.

The central control device 230 may learn from gestures performed by the user 222 and determine the location of the user 222 to perform control of various control-target devices in the user's location. The central control device 230 may record the gestures of the user 222 and an identified location of the gesture in the gesture datastore. The wearable control device 228 and/or the central control device 230 may enter a programming mode for recording the gestures performed by the user 222. The programming mode may be entered by performing a programming gesture using the wearable control device 228, actuating one or more buttons on the wearable control device 228, and/or actuating one or more buttons on the wireless communication device 232.

The user 222 may define the control parameters for a learned gesture. The control parameters may be entered via the wireless communication device 232 and/or the wearable control device 228. For example, the user 222 may define the boundaries of the location in which the gesture may be applied, the control-target devices to which the gesture is associated, and/or the control instructions for being sent to the control-target devices. While the control parameters may be entered by the user 222 via the wireless communication device 232 or the wearable control device 228, the control parameters may be sent to the central control device 230 for being stored in the gesture datastore.

The location in which the gesture may be applied may be defined in terms of distance from one or more control-target devices, an area in which one or more control-target devices are located, or the distance from an area in which the control-target devices are located. The identity of the control-target devices to which the gesture may be defined by a user selection of the control-target devices on the wireless communication device 232 or the wearable control device 228. The identity of the control-target devices to which the gesture may be applied may be defined by performing a gesture on the wearable control device 228 that identifies the control-target devices. For example, the control-target devices may be identified based on a vector that is pointed from the wearable control device 228 to the control-target device. The vector may be identified by the wearable control device 228 and transmitted to the central control device 230 for identifying the control-target devices indicated by the vector. The control instructions for being sent to the control-target devices may be defined by a user selection on the wireless communication device 232 or the wearable control device 228. For example, the user 222 may record a gesture for controlling the lighting control device 204 and may associate the gesture with control instructions for turning on the lamp 206, increasing the amount of power provided to the lamp 206 a predetermined amount, decreasing the amount of power provided to the lamp 206 a predetermined amount, or setting the intensity of the lamp 206 to a predetermined level. In another example, the user 222 may record a gesture for controlling the motorized window treatment 216 and may associate the gesture with control instructions for raising the covering material 218 by a predetermined amount, lowering the covering material by a predetermined amount, or setting the position of the covering material 218 to a predetermined level. The recorded gesture may be associated with similar control instructions for controlling the temperature control device 220, the plug-in control device 224, or another control-target device.

The central control device 230 may learn to automatically control one or more control-target devices in the load control environment 202 based on gestures performed by the user 222. The central control device 230 may identify when the user 222 repeatedly performs (e.g., more than a predetermined number of times) a gesture in a location for controlling one or more identified control-target devices. The gesture may be a preprogrammed gesture that is associated with load control instructions for controlling an electrical load, such as the user 222 raising an arm to increase the dimming intensity of the lamp 206 when the user 222 enters the load control environment 202. The gesture may also, or alternatively, be a natural gesture performed by the user 222 to control an electrical load, such as the user 222 actuating a raise button on a wall-mounted dimmer (not shown) to increase the intensity level of the lamp 206 when the user 222 enters the load control environment 202.

The central control device 230 may store gestures performed by the user 222 temporarily to determine whether to associate the gesture with a control-target device and/or control instructions. The central control device 230 may also store the location of the user 222 when the user 222 performed the gesture and/or the time at which the gesture was performed. The central control device 230 may determine whether the status of an electrical load or a control-target device has changed within a predetermined period of time from the user performing the gesture. The central control device 230 may automatically send load control instructions for controlling one or more electrical loads based on one or more gestures performed by the user 222 a predetermined number of times, the time the one or more gestures were performed, the location at which the one or more gestures were performed, and/or the change in status of one or more electrical loads after the one or more gestures were performed by the user 222.

The central control device 230 may determine to associate the gesture with a control-target device and/or control instructions when the central control device 230 identifies the gesture being performed repeatedly (e.g., more than a predetermined number of times) in the same location and/or at the same time of day or week. In an example, the central control device 230 may identify that the user 222 performs the same gesture a predetermined number of times when the user 222 enters the load control environment 202. The central control device 230 may detect that the status of the lamp 206 is changed to turn on after the user 222 performs the gesture. The gesture performed by the user 222 may be a gesture that is associated with load control instructions for turning on the lamp 206, or the user 222 flipping a switch to turn on the lamp 206, for example. After the central control device 230 identifies that the gesture is performed the predetermined number of times, the central control device 230 may associate the gesture in the gesture datastore with the lighting control device 204 and control instructions for turning on the lamp 206, such that the lamp 206 may be automatically turned on when the user 222 enters the load control environment 202. The central control device 230 may similarly automate the control of other control-target devices in the load control environment 202.

The user 222 may indicate whether the user 222 likes or dislikes the automated control of the control-target devices in the load control environment 202. The user 222 may indicate whether the user 222 likes or dislikes the automated control of the control-target devices by actuating one or more buttons on the wireless communication device 232 and/or the wearable control device 228. The user 222 may indicate whether the user 222 likes or dislikes the automated control of the control-target devices by performing one or more gestures that are identifiable by the wearable control device 228. The actuation of the one or more buttons or the performance of one or more gestures by the user 222 may cause transmission of a digital message to the central control device 230 that includes feedback that indicates whether the user 222 likes or dislikes the automated control of the control-target devices.

The central control device 230 may expect to receive the feedback indicating whether the user 222 likes or dislikes the automated control of the control-target devices within a predetermined period of time after the automated control is implemented. If the user 222 does not provide the feedback within the predetermined period of time, the central control device 230 may assume the user 222 likes the automated control.

The central control device 230 may have different learning strengths for learning gestures performed by the user 222. For example, the user 222 may be configured to set the central control device (e.g., via the wireless communication device 232 and/or the wearable control device 228) to different levels of learning strength. The levels of learning strength may range from weaker to stronger learning strength. As the levels increase in strength of learning, the number of gestures that may be stored within a period of time and/or the length of time for which gestures are stored may be increased. The greater number of gestures being stored and/or the greater length of time for which gestures are stored may enable more gestures to be performed by the user 222 and identified as being performed a predetermined number of times.

The central control device 230 may recommend changes to the load control instructions associated with a gesture based on additional gestures identified by the central control device 230 and/or a change in status of an electrical load or a control-target device. For example, the user 222 may perform a gesture associated with control instructions for turning on the lamp 206. The central control device 230 may identify that the user 222 changes the dimming level after the lamp 206 is turned on. The change in dimming level may be detected by identifying a gesture associated with control instructions for changing the dimming level or a gesture by the user 222 to increase the dimming level on a wall-mounted dimmer switch. The central control device 230 may also, or alternatively, detect a change in the status of the dimming level of the lamp 206. The central control device 230 may recommend, via a display on the wearable control device or the wireless communication device 232, a change in the load control instructions associated with the gesture performed by the user 222 to turn on the lamp 206. The central control device 230 may recommend the gesture performed by the user 222 be associated with turning on the lamp 206 to the adjusted dimming level detected by the central control device 230, for example. The suggested change may similarly be identified for controlling one or more other control-target devices. The change may be selected after detecting gestures performed by the user 222 a predetermined number of times.

When the central control device 230 detects a change in the status of an electrical load or control-target device (e.g., a single time or a predetermined number of times) and that there is not a gesture associated with control instructions for performing the detected change, the central control device 230 may ask the user 222 (e.g., via a display on the wearable control device 228 or the wireless communication device) whether the user 222 would like to record a gesture for performing the detected change. For example, when the central control device 230 detects a change in the status of an electrical load or control-target device and that there is not a gesture associated with control instructions for performing the detected change, the user 222 may perform a gesture and associate the gesture with control instructions for performing the detected change. The central control device 230 may be configured to associate a natural gesture with the control instructions, may be configured to associate a unique gesture with the control instructions, and/or may be configured to associate a previously associated gesture with the control instructions.

A natural gesture may be a gesture that the user 222 may perform naturally. A natural gesture may be a gesture performed naturally by the user 222 when changing the status of the electrical load. For example, the user 222 may perform the natural gesture of rotating, raising, or lowering an intensity adjustment actuator of a dimmer to control a dimming intensity of the lamp 206, and this natural gesture of rotating the user's wrist, or raising or lowering an arm, may be associated with lighting control device 204 to adjust the dimming intensity of the lamp 206. The central control device 230 may ask the user 222, after performing a natural gesture, whether to assign the gesture to a control instruction and/or an electrical load. The central control device 230 may learn (e.g., automatically learn) the natural gesture and associate the gesture with a control instruction and/or electrical load. For example, the central control device 230 may learn that each time that the user 222 sits on a couch and points a television remote control at a television, the user 222 also lowers the intensity of one or more lamps 206 in the room. The central control device 230 may learn this gesture of the user 222, and the central control device 230 may associate the user 222 pointing the television remote control at the television with lowering the intensity of one or more lamps 206 in the room.

The central control device 230 may be configured to control (e.g., automatically control) the electrical loads in response to detecting a preprogrammed natural gesture. For example, the central control device 230 may be configured to determine that the user 222 is moving quickly (e.g., by determining that the user's arms are swinging while moving) and may automatically turn lamp 206 on to full intensity. The central control device 230 may be configured to determine that a user has fallen asleep (e.g., by detecting a lack of movement of the user 222) and may automatically dim and/or turn off lamp 206. The central control device 230 may be configured to determine that the user 222 is exercising and/or performing a particular activity. The central control device 230 may control the electrical load to a desired level, based on the exercise and/or the activity. For example, the central control device 230 may be configured to determine an activity mode (e.g., a warm up mode, active mode, cool down mode, rest mode, etc.) associated with the exercise and/or activity and the central control device 230 may be configured to control the electric load accordingly (e.g., may set the lamp 206 to a desired level, based on the activity mode).

A unique gesture may be a gesture that the user 222 does not perform naturally. A unique gesture may be a gesture that a user does not typically perform, such that the unique gesture may not be confused with a natural gesture and/or a previously associated gesture. For example, a unique gesture may include having the user 222 hold an arm at a right angle. The gesture of holding an arm at a right angle may not be a natural gesture, and/or the gesture of holding an arm at a right angle may not be a previously associated gesture. Because the unique gesture may not be a natural gesture and/or a previously associated gesture, the unique gesture may not be confused with natural gestures and/or previously associated gestures. A unique gesture may be used for ordinary changes to an electric load (e.g., dimming a light) and/or a unique gesture may be used for extreme changes to an electric load (e.g., actuating an emergency system, such as a fire alarm, a sprinkler system, etc.).

Though functionality may be described herein as being performed by a certain device, other devices may be similarly configured, alone or in combination with other devices, to perform such functionality. For example, though one control device, such as the central control device 230, the wearable control device 228, the wireless communication device 232, or a control-target device may be described as performing certain functionality, one or more other control devices (e.g., the central control device 230, the wearable control device 228, the wireless communication device 232, or a control-target device) may be configured to perform similar functionality.

Figure 3:
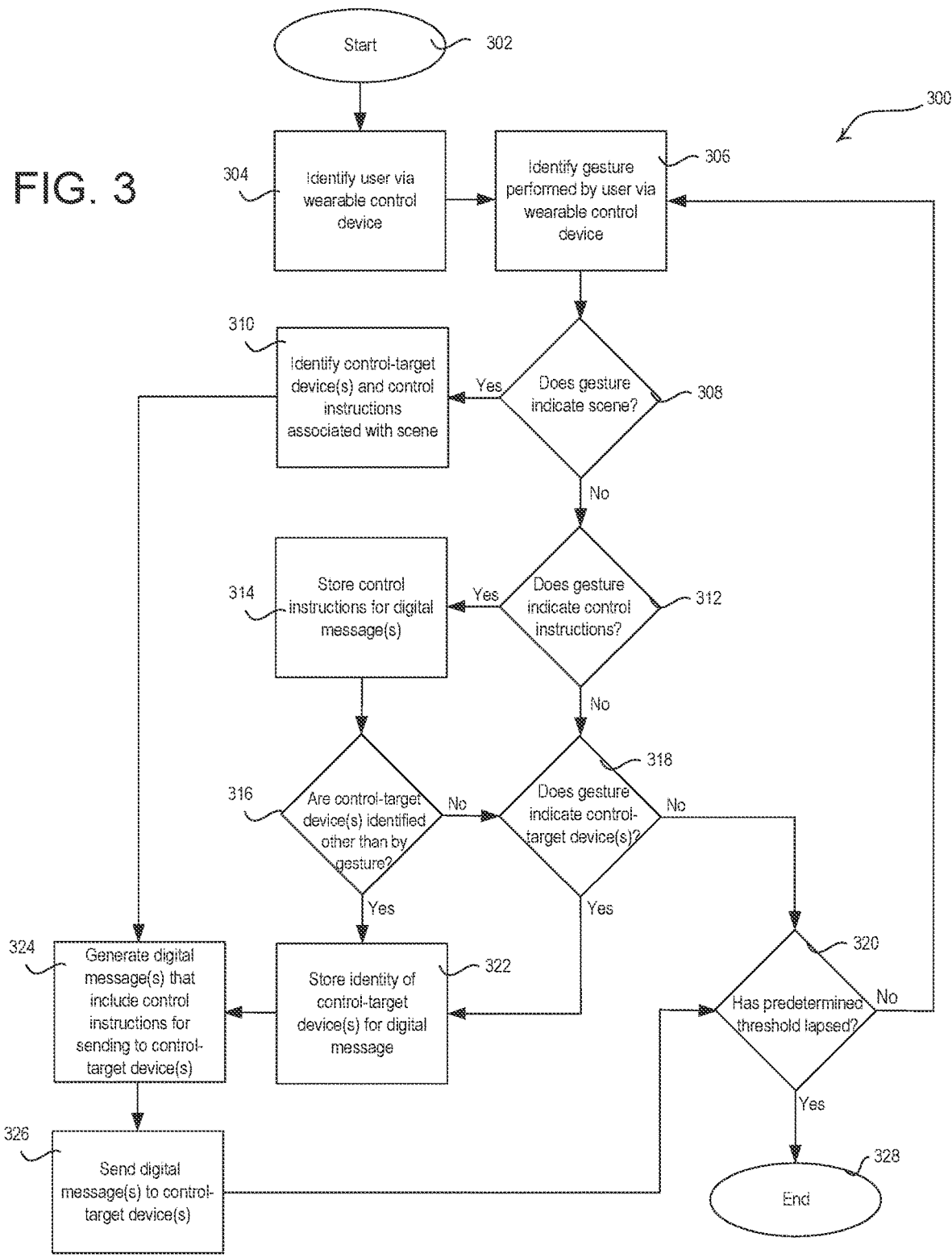
FIG. 3 is a simplified flow diagram depicting an example method for performing gesture-based control of one or more control-target devices.

FIG. 3 is a simplified flow diagram depicting an example method 300 for performing gesture-based control of one or more control devices using a wearable control device. One or more portions of the method 300 may be performed by a wearable control device, a central control device, a wireless communication device, a control-target device, or any combination thereof (e.g., the wearable control device 228, the central control device 230, and/or the wireless communication device 232 shown in FIG. 2). The method 300 may begin at 302. At 304, a user may be identified using the wearable control device. For example, the wearable control device may transmit digital messages to the central control device and/or the wireless communication device that include a unique identifier. The digital messages including the unique identifier may be triggered by actuation of one or more buttons, one or more gestures performed by the user, and/or a determination of the location of the user (e.g., via near field communication with an NFC device and/or via a GPS circuit).

The user may perform a gesture to control one or more electrical loads in a load control environment. The gesture performed by the user may be identified at 306 by the wearable control device. For example, the wearable control device may send a digital message to the wireless communication device or the central control device that indicates the identified gesture. At 308, a determination may be made as to whether the gesture indicates a scene. For example, the wireless communication device or the central control device, upon receiving a digital message indicating a gesture from the wearable wireless device, may determine whether the gesture indicates a scene at 308. The gesture identified by the wearable control device may be compared with one or more preconfigured gestures, at 308, to determine whether the gesture is associated with a preprogrammed scene configuration for the load control environment in a datastore. If the gesture is associated with a preprogrammed scene at 308, control instructions for controlling the appropriate control-target devices may be determined at 310. For example, the wireless communication device or the central control device may identify the control-target devices for being controlled in the scene, as well as the control instructions for controlling the control-target devices at 310. A unique identifier of the control-target devices and the control instructions associated with the scene may be retrieved from storage at the wireless communication device or the central control device. If, at 308, the gesture does not indicate a scene, the method 300 may determine whether other information being indicated by the gesture.

At 312, a determination may be made as to whether the gesture indicates control instructions. For example, the wireless communication device or the central control device may determine whether the gesture indicates control instructions at 312. The gesture identified by the wearable control device may be compared with one or more preconfigured gestures, at 312, to determine whether the gesture is associated with control instructions in the datastore. If the gesture identifies control instructions at 312, the control instructions may be stored, at 314, for being sent in a digital message to one or more identified control-target devices. At 316, a determination may be made as to whether the control-target device has been identified other than by the gesture identified at 306. For example, the wireless communication device or the central control device may determine, at 316, whether the control-target device has been identified other than by the gesture identified at 306. For example, the user may have identified the control-target device via another gesture previously performed by the user or by actuating one or more buttons on the wireless communication device. If the control-target device is identified other than by the gesture performed at 306, the identity of the control-target device to which a digital message will be sent may be stored at 322. For example, the wireless communication device or the central control device may store the identity of the control-target device for being sent in a digital message at 322. The identity of the control-target device may not be stored again at 322 if the identity of the control-target device has already been stored for being sent in a digital message (e.g., if the identity of the control-target device was already stored as a result of previously identified gesture or actuation on the wireless communication device).

If, at 312, it is determined that the identified gesture does not indicate control instructions or, at 316, the control-target device has not been identified other than by the gesture, a determination may be made as to whether the gesture identified at 306 indicates the identity of one or more control-target devices at 318. For example, the wireless communication device or the central control device may determine, at 318, whether the gesture identified at 306 indicates the identity of one or more control-target devices. The gesture identified by the wearable control device may be compared with one or more preconfigured gestures, at 318, to determine whether the gesture is associated with one or more control-target devices in the datastore. The identified gesture may be associated with the unique identifier of one or more control-target devices, a device type, and/or a zone or location of control-target devices. If the identified gesture is associated with a device type, a zone, and/or a location of the control-target devices for being controlled, the wireless communication device or the central control device may determine the unique identifiers of the control-target devices in the control system having the identified device type, within the identified zone, and/or within the identified location. The gesture may also, or alternatively, indicate a vector (e.g., indicated by the direction of the user's arm or the direction that a user is facing or looking) that points in a direction of one or more control devices in the load control environment. The vector may be compared with a map of the load control environment to determine the identity of the one or more control devices indicated by the vector. The identity of the control-target devices may be stored at 322 for sending digital messages to the identified control-target devices.

If the gesture identified at 306 does not indicate a scene at 308, control instructions at 312, or a control-target device at 318, a determination may be made (e.g., by the wearable control device, the wireless communication device, and/or the central control device), at 320, whether a predetermined threshold for identifying gestures performed by the user has elapsed. The predetermined threshold may be a period of time (e.g., a period of time without having an identified gesture at 306, a lack of movement identified by the wearable control device for the period of time, etc.), a number of identified gestures, or another predetermined threshold for stopping the identification of gestures at 306. If the predetermined threshold has lapsed at 320, the method 300 may end at 328. If the predetermined threshold has not lapsed at 320, the method 300 may return to 306 to identify another gesture performed by the user or otherwise determine the control-target devices to which digital messages may be transmitted.

When the control-target devices and the control instructions have been identified, appropriate digital messages may be generated at 324. For example, the wireless communication device or the central control device, at 324, may generate digital messages that include the control instructions for transmitting to the control-target devices. The digital messages may include the unique identifier of the control-target devices; or the digital messages may include an indirect identifier, such as a device type, a zone, or a location of the control-target device, and the control-target device may determine whether to execute the control instructions based on the indirect identifier. The digital messages may be sent at 326. After sending the digital messages at 326, a determination may be made (e.g., by the wearable control device, the wireless communication device, and/or the central control device), at 320, whether a predetermined threshold for identifying gestures performed by the user has elapsed. If the predetermined threshold has lapsed at 320, the method 300 may end at 328. If the predetermined threshold has not lapsed at 320, the method 300 may return to 306 to identify another gesture performed by the user. While one or more portions of the method 300 may be described as being performed by a wearable control device, a central control device, or a wireless communication device, the method 300 may be performed using any number of devices.

Figure 4:
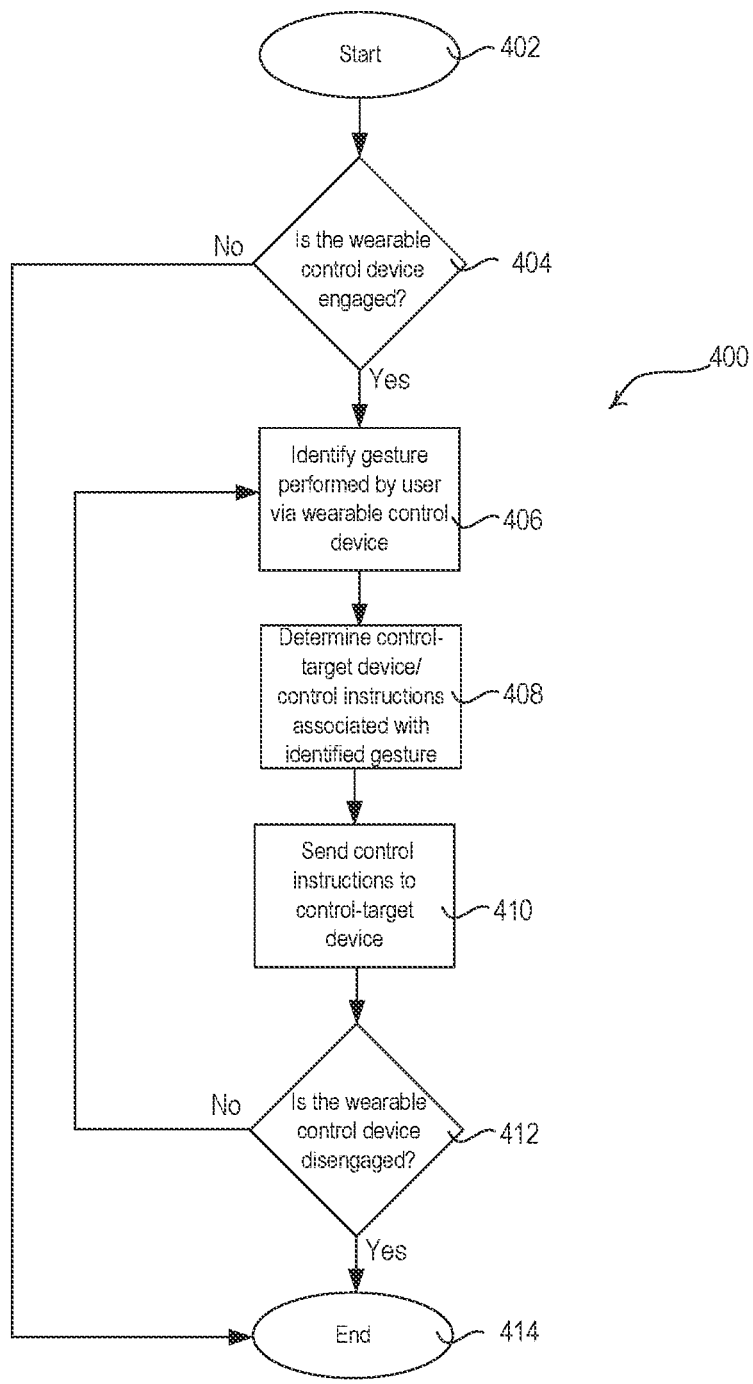
FIG. 4 is a simplified flow diagram depicting another example method for performing gesture-based control of one or more control-target devices.

FIG. 4 is a simplified flow diagram depicting an example method 400 for engaging and disengaging a wearable control device for identifying gestures for controlling an electrical load. The method 400 may be performed by a wearable control device, a central control device, a wireless communication device, a control-target device, or any combination thereof (e.g., the wearable control device 228, the central control device 230, and/or the wireless communication device 232 shown in FIG. 2). The method 400 may begin at 402. At 404, a determination may be made as to whether the wearable control device is engaged. For example, the wearable control device 228, the central control device 230, and/or the wireless communication device 232 may determine whether the wearable control device is engaged at 404. The wearable control device may detect an engage command from a user and may be engaged for identifying gestures for controlling an electrical load. The wearable control device may transmit a digital message to the central control device and/or the wireless communication device that indicates that the wearable control device is engaged. The digital message may also engage the central control device and/or the wireless communication device for receiving digital messages from the wearable control device for controlling an electrical load.

The wearable control device may be engaged by actuation of one or more buttons on the wearable control device, actuation of one or more buttons on the wireless communication device, and/or an engage gesture performed via the wearable control device. The engage gesture may be identified after being performed for an established period of time, such as a three second period of time for example. The engage gesture may include one or more gestures (e.g., a sequence of gestures) that may be unlikely to be performed by a user by mistake. For example, the user may perform a movement that is unlikely to be performed by a user when the user is not engaging the wearable control device. In another example, the engage gesture may be performed for a longer period of time (e.g., 10-20 seconds) than other gestures for controlling an electrical load or that may be likely to be performed naturally by the user.

The wearable control device may identify the user's arm being raised for a predetermined period of time to engage the wearable control device. In another example, the wearable control device may be engaged by changing the orientation of the wearable control device (e.g., shaking the wearable control device) a predetermined number of times within a period of time. When the wearable control device is a watch, or other armband, the wearable control device may be engaged by raising the wearable control device upward and toward the user, as if to check the time or look at a display on the armband. Such a gesture may be detected by identifying the user raising the wearable control device, bringing the wearable control device toward the user, and changing the orientation of the wearable control device.

If the engage gesture is not identified at 404, the method 400 may end at 414. If the engage gesture is identified at 404, the method 400 may continue to identify a gesture for controlling an electrical load at 406. The identification of the engage gesture at 404 may enable the wearable control device to identify the gesture at 406 and/or send digital messages for controlling an electrical load. Without identifying the engage gesture, the wearable control device may be unable to identify other gestures for load control. At 408, control-target devices and/or the control instructions associated with an identified gesture may be determined. The control-target devices and the control instructions may be a part of a scene indicated by the gesture. The control-target devices may be identified with separate gestures or otherwise identified from the gestures that identify the control instructions. The control instructions may be sent to the identified control-target device at 410 for controlling an electrical load.

At 412, a determination may be made as to whether device the wearable control device is disengaged. For example, the wearable control device 228, the central control device 230, and/or the wireless communication device 232 may determine whether the wearable control device is disengaged at 412. The wearable control device may detect a disengage command from a user and may be disengaged from identifying gestures for controlling an electrical load. The wearable control device may transmit a digital message to the central control device and/or the wireless communication device that indicates that the wearable control device is disengaged. The digital message may also disengage the central control device and/or the wireless communication device for receiving digital messages from the wearable control device for controlling an electrical load.

The wearable control device may be disengaged by actuation of one or more buttons on the wearable control device, actuation of one or more buttons on the wireless communication device, and/or a disengage gesture performed via the wearable control device. The disengage gesture may be identified after being performed for an established period of time, such as a three second period of time for example. The disengage gesture may include one or more gestures (e.g., a sequence of gestures) that may be unlikely to be performed by a user by mistake. For example, the user may perform a movement that is unlikely to be performed by a user when the user is not disengaging the wearable control device. In another example, the disengage gesture may be performed for a longer period of time (e.g., 10-20 seconds) than other gestures for controlling an electrical load or that may be likely to be performed naturally by the user. The engage and disengage gesture may be the same or different gestures.

The wearable control device may identify the user's arm being lowered for a predetermined period of time to disengage the wearable control device. In another example, the wearable control device may be disengaged by changing the orientation of the wearable control device (e.g., shaking the wearable control device) a predetermined number of times within a period of time. The disengage gesture may cause the wearable control device to be unable to identify a gesture for load control until the engage gesture is identified. If the disengage gesture is identified at 412, the method may end at 414. If the disengage gesture is not identified at 412, the method 400 may continue to identify load control gestures at 406. While one or more portions of the method 400 may be described as being performed by a wearable control device, a central control device, or a wireless communication device, the method 400 may be performed using any number of devices.

Figure 5A:
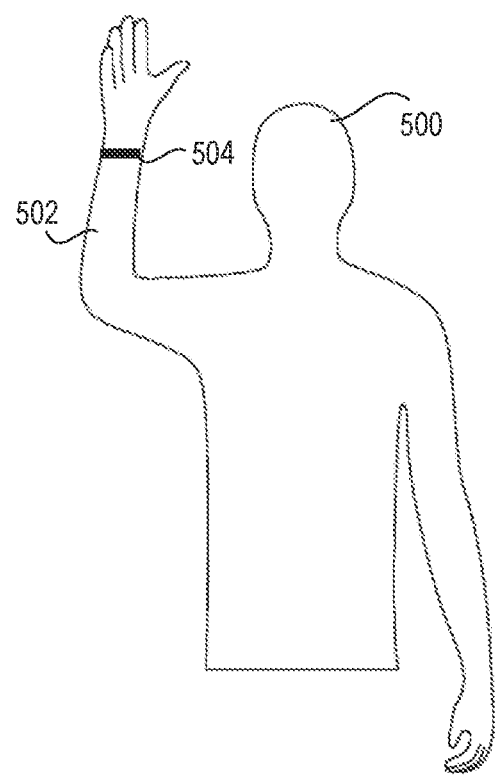
FIGS. 5A-5E depict example gestures that may be performed for controlling control-target devices.
Figure 5B:
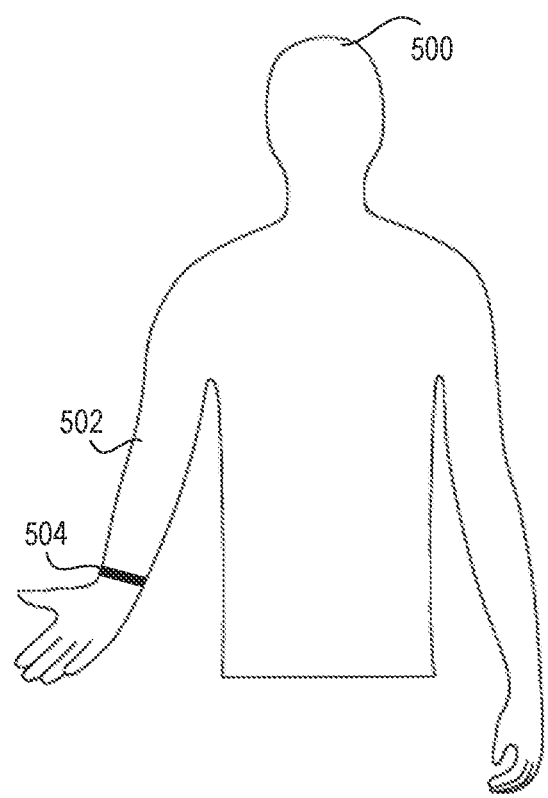

FIGS. 5A-5E depict example gestures that may be identified for indicating a control-target device and/or control instructions for controlling an electrical load. As shown in FIGS. 5A and 5B, a wearable control device 504 may identify a user 500 raising an arm 502 (e.g., FIG. 5A) or lowering an arm 502 (e.g., FIG. 5B). The user 500 raising the arm 502 may be associated with load control instructions and/or a control device. For example, when the wearable control device 504 identifies the user 500 raising the arm 502, a digital message may be transmitted to a control-target device instructing the control-target device to increase an amount of power provided to the electrical load (e.g., turn on a lamp, increase the dimming level of the lamp, etc.). When the wearable control device 504 identifies the user 500 raising the arm 502, digital messages may also, or alternatively, be transmitted to a motorized window treatment for raising a covering material, a temperature control device for increasing the temperature in a room, and/or another control-target device for performing another associated instruction.

The user 500 lowering the arm 502 may be associated with load control instructions and/or a control device. For example, when the wearable control device 504 identifies the user 500 lowering the arm 502, a digital message may be transmitted to a control-target device instructing the control-target device to decrease an amount of power provided to the electrical load (e.g., turn off a lamp, decrease the dimming level of the lamp, etc.). When the wearable control device 504 identifies the user lowering the arm 502, digital messages may also, or alternatively, be transmitted to a motorized window treatment for lowering a covering material, a temperature control device for decreasing the temperature in a room, and/or another control-target device for performing another associated instruction.

Figure 5C:
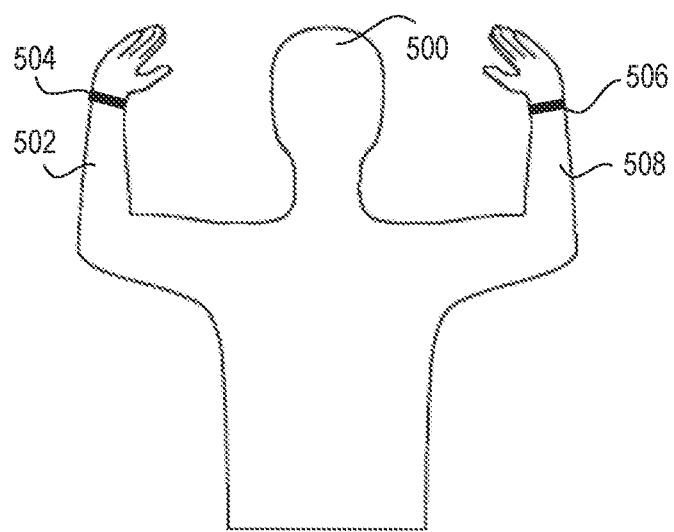
Figure 5D:
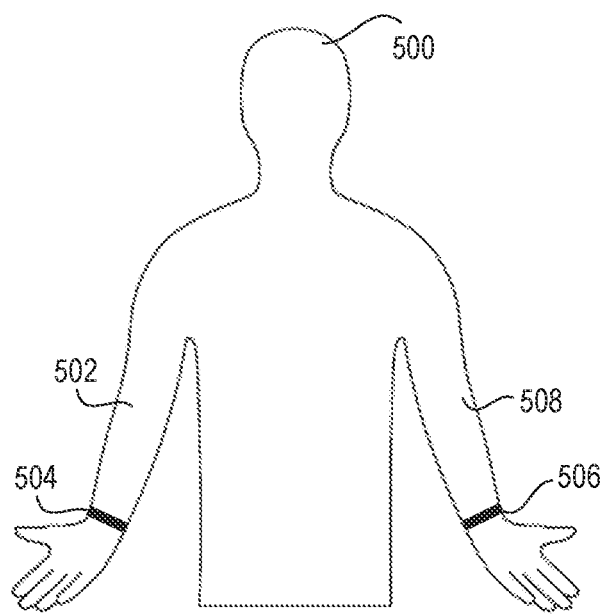

As shown in FIGS. 5C and 5D, a gesture may be identified when the user 500 moves more than one part of the body. As shown in FIG. 5C, a first wearable control device 504 may identify the user 500 raising a left arm 502 and a second wearable control device 506 may identify the user raising a right arm 508. As shown in FIG. 5D, the first wearable control device 504 may identify the user 500 lowering the left arm 502 and the second wearable control device 506 may identify the user lowering the right arm 508. The gesture identified by the user raising or lowering the arms 502, 508 may correspond to a single set of control instructions and/or a control-target device for transmitting digital messages that include the control instructions. In another example, different functions may be performed by the user 500 performing a gesture with each arm 502, 504. The user raising or lowering the left arm 502 may identify a control-target device and the user 500 raising or lowering the right arm 508 may identify load control instructions for controlling the control-target device (or vice versa).

When multiple wearable control devices 504, 506 are used to detect user gestures, the wearable control devices 504, 506 may be in communication with one another. For example, the first wearable control device 504 may be a watch capable of wirelessly communicating with the second wearable control device 506, which may be another type of armband. While multiple wearable control devices 504, 506 are illustrated in FIGS. 5C and 5D for identifying when the user 500 moves more than one part of the body, multiple body movements may be detected using a single gesture control device (e.g., a shirt having sensors to detect different body movements).

The speed at which a gesture is performed may be identified by tracking the speed of the wearable control device 504, 506. The speed at which a gesture is performed may be used to indicate a control device or control instructions. The speed at which a gesture is performed may be used to indicate a speed at which an electrical load controlled by the control device may be controlled. For example, the speed at which the wearable control device 504, 506 is raised or lowered may indicate a respective speed for raising or lowing the position of the covering material controlled by the motorized window treatment or for increasing or decreasing the dimming level of a lamp.

The speed indicated in the control instructions may be based on the speed at which the wearable control device 504, 506 moves, taking into consideration the operation speed of the device being controlled. The speed indicated in the control instructions may be the same speed at which the wearable control device 504, 506 moves or otherwise determined from the speed at which the wearable control device 504, 506 moves. For example, the speed at which the wearable control device 504, 506 moves may be a percentage of the speed indicated in the control instructions or the speed indicated in the control instructions may be a percentage of the speed at which the wearable control device 504, 506 moves.

The distance over which a gesture is performed may be identified. The distance may be identified by tracking the distance over which the wearable control device 504, 506 moves. The distance over which a gesture is performed may be used to indicate a control device or control instructions. The distance over which a gesture is performed may be used to indicate a distance or range over which a device controlled by the control-target device may be instructed to change. For example, the distance that the wearable control device 504, 506 is raised or lowered may be identified and the control instructions sent to an identified motorized window treatment may indicate a distance for raising the position of the covering material controlled by the motorized window treatment. In another example, the distance over which the wearable control device 504, 506 is raised or lowered may be identified and the control instructions sent to an identified lighting control device may indicate a range for increasing or decreasing the dimming level of a lamp controlled by lighting control device. The distance indicated in the control instructions may be otherwise determined from the distance over which the wearable control device 504, 506 may move. For example, the distance over which the wearable control device 504, 506 moves may be a percentage of the distance indicated in the control instructions or the distance indicated in the control instructions may be a percentage of the distance over which the wearable control device 504, 506 moves.

One or more of the gestures in FIGS. 5A-5D may be used to engage the wearable control device 504, 506, disengage the wearable control device 504, 506, or send a digital message for controlling an electrical load. The digital messages may be sent to one or more control-target devices to control the devices according to an established scene. Other gestures may also be used to transmit digital messages for controlling one or more electric loads (e.g., according to an established scene). For example, the user 500 may perform a goodbye wave when leaving a load control environment (e.g., such as a home or office) to transmit digital messages for controlling one or more electric loads according to an away scene. The goodbye wave may be a wave of either arm 502, 508 from side to side (e.g., left and right). The user 500 may perform another gesture when arriving at the load control environment (e.g., such as the home or office) to transmit digital messages for controlling one or more electric loads according to a home scene. For example, the user may perform the same wave as the goodbye wave or may perform a hello wave by moving either arm 502, 508 up and down, instead of side to side. The location of the user 500 may be paired with the wave to determine whether the user is leaving or arriving.

Figure 5E:
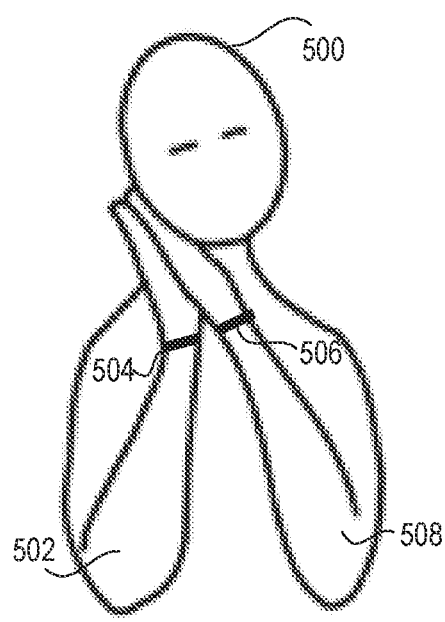

FIG. 5E shows an example of a sleep gesture for entering a bedtime scene. The sleep gesture may be identified by the location of one or both of the arms 502, 508 of the user 500. For example, after one of the wearable control devices 504, 506 measures the angle of the respective arm 502, 508, the angle of the arm 502, 508 may be compared against the predefined angle for activating the bedtime mode. When the user has multiple wearable control devices 504, 506, the proximity between the devices 504, 506 may be used to select the bedtime scene. For example, the proximity between the devices 504, 506 may be determined based on the signal strength of communications between the devices. When the wearable control devices 504, 506 are within a predetermined proximity, the bedtime mode may be activated.

A wakeup scene may be implemented when the user 500 wakes up or in order to help wake up the user 500. For example, the wakeup scene to turn on one or more lamps and set the lamps to a predetermined dimming level, increase or decrease the temperature on the temperature in a load control environment, and/or raise the covering material of a motorized window treatment to a predetermined level. The wakeup scene may also, or alternatively, turn on music (e.g., on a wireless communication device or other music device) or turn on a television at a predetermined volume level. The user 500 may perform a snooze gesture to implement the wakeup scene or delay the wakeup scene by a predetermined period of time. The snooze gesture may be identified by the user 500 moving one of the arms 502, 508 up and down, as if to hit a snooze button on a clock for example.

A movie scene may be activated with the user 500 points the wearable control device 504, 506 at the location of the television and/or gestures to turn on the television using a remote control. The location of the television may be identified by a vector that points in the direction of the television from the wearable control device 504, 506 when the user 500 extends an arm 502, 508. The movement of the user 500's thumb may be detected if the user 500 is wearing a ring based on the movement of the ring up and down to indicate a user selection of a button on a remote control. The movement of the user 500's thumb may be similarly detected by the wearable control device 504, 506, as the armband may detect movement of the thumb of the user 500 up and down.

Figure 6:
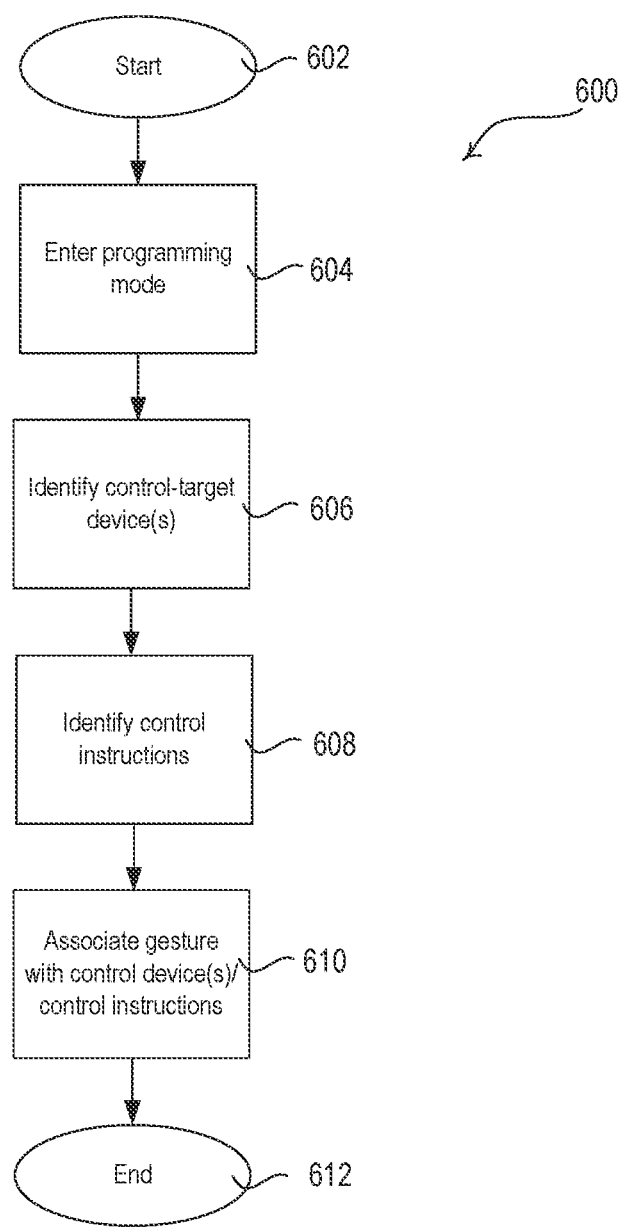
FIG. 6 is a simplified flow diagram depicting an example method for associating a gesture with control-target devices and/or control instructions.

FIG. 6 is a simplified flow diagram depicting an example method 600 for associating a gesture with a control-target device and/or control instructions. The method 600 may be performed by a wearable control device, a central control device, a wireless communication device, a control-target device, or any combination thereof (e.g., the wearable control device 228, the central control device 230, and/or the wireless communication device 232 shown in FIG. 2). The method 600 may begin at 602. A programming mode may be entered, at 604, by the wearable control device and/or the central control device. The programming mode may be entered upon the identification of a programming gesture and/or actuation of one or more buttons on the wearable control device. The programming mode may also, or alternatively, be entered upon actuation of one or more buttons on the wireless communication device. Identification of the programming gesture may enable the central control device, the wireless communication device, and/or the wearable control device to store programming instructions for controlling an electrical load. For example, the programming gesture may enable association of one or more gestures with a control-target device and/or control instructions in the gesture datastore. The programming gesture may include one or more gestures (e.g., a sequence of gestures) that may be unlikely to be performed by a user by mistake. For example, the user may perform a movement that is unlikely to be performed by a user when the user is not programming the wearable control device. The programming gesture may be performed for a longer period of time (e.g., 10-20 seconds) than other gestures may be performed, such as gestures that may be recognized by the wearable control device for load control or that may be likely to be performed naturally by the user.

At 606, a control-target device may be identified for being associated with a gesture. The control-target device may be identified by a gesture. For example, the user may point the wearable control device in the direction of the control-target device to be controlled. A vector from the wearable control device may be compared against a map of the room (e.g., at the central control device) to determine the control-target device selected by the user. When the wearable control device is an armband, the user may change the orientation of the user's wrist a number of times to select different control-target devices, different types of control-target devices in a location (e.g., living room lights, kitchen lights, etc.) or different locations. One or more control-target devices may be associated with each change in orientation. The user may also, or alternatively, perform a gesture that is currently associated with a control-target device to change the gesture that is currently associated with the control-target device to another gesture. The control-target device may also, or alternatively, be selected by an actuation on the wireless communication device, actuation of a button on the wearable control device, or by the user speaking the name of the control-target device or electrical load to be controlled. The name of the control-target device or electrical load may be recorded by the wireless communication device and/or the wearable control device and sent to the central control device for identification. One or more control devices may be identified at 606.

Control instructions may be identified at 608 for being associated with a gesture for performing load control. The control instructions may be identified by a gesture. For example, the user may perform a gesture that is currently associated with control instructions for controlling a control target device in order to change the gesture that is currently associated with the control instructions to another gesture. The gesture that identifies the control instructions may be the same gesture that identifies the control-target device (e.g., gesture associated with a scene). The control instructions may also, or alternatively, be selected by an actuation on the wireless communication device, actuation of a button on the wearable control device, or by the user speaking the control instructions for how to control the identified control-target device. One or more sets of control instructions may be identified at 608.

The user may associate a gesture, at 610, with the identified control-target device and/or the identified control instructions. The gesture may be recorded by the wearable control device for being associated with the identified control-target device and/or the identified control instructions. The recorded gesture may be associated with the identified control-target device and/or the identified control instructions and stored at the wearable control device. The recorded gesture may also, or alternatively, be sent to the central control device and/or the wireless communication device for being associated with the identified control-target device and/or the identified control instructions. The association may be stored in the gesture datastore for controlling one or more control-target devices using the identified gesture.

The gesture may also, or alternatively, be selected by an actuation on the wearable control device or the wireless communication device. For example, the central control device may recognize that a number of users are controlling the identified control-target device using a certain gesture. The central control device may send a digital message to the wearable control device or the wireless communication device to suggest to the user the gesture to associate with the identified control-target device and/or identified control instructions based on the gesture being used by other users. The user may select the suggested gesture for being applied to the user's control of the identified control-target device. The user may also apply the suggested gesture to other users' control of the identified control-target device. For example, where the user is a building administrator, the user may program the gestures for controlling the identified control-target devices based on the more popular gestures being used in the building, or a portion of the building. The method 600 may end at 612.

Figure 7:
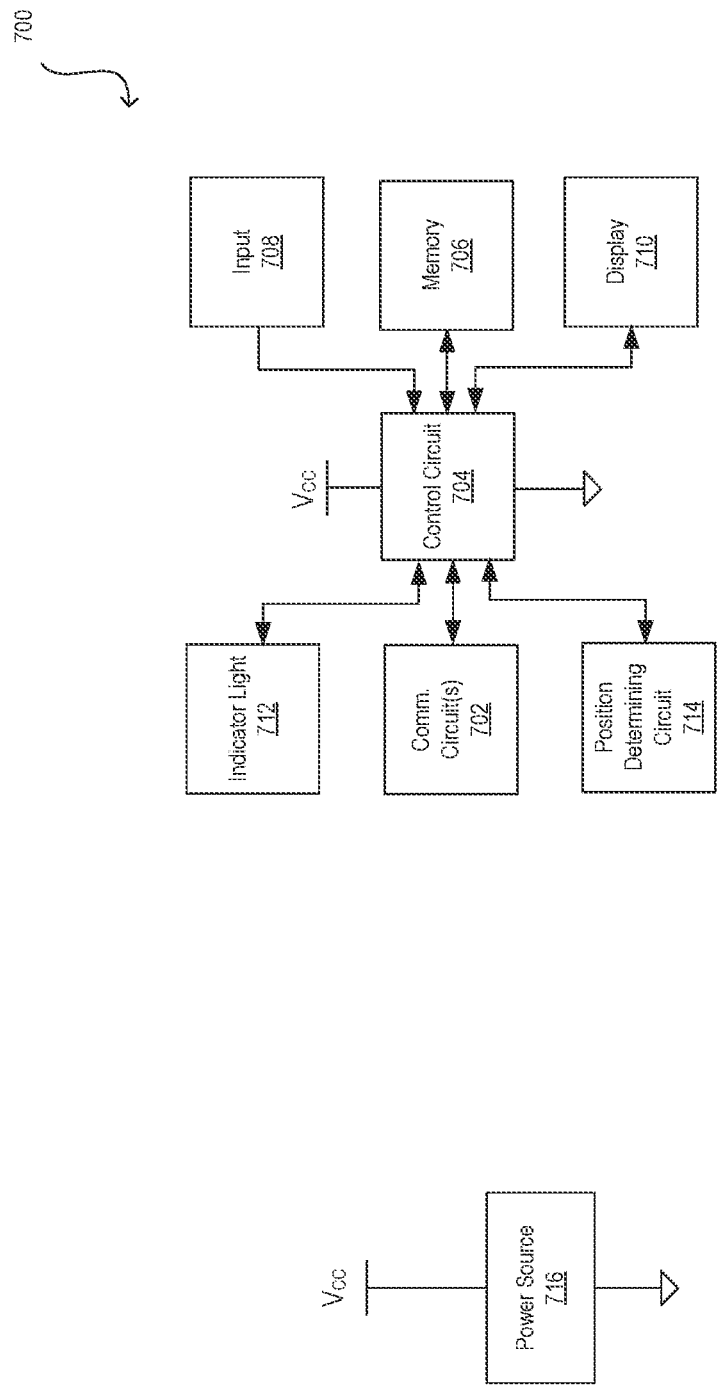
FIG. 7 is a block diagram depicting an example of a wearable control device.

FIG. 7 is a block diagram depicting an example wearable control device 700 for performing load control (e.g., the wearable control device 228 shown in FIG. 2 or the wearable control devices 504, 506 shown in FIGS. 5A-5E). As shown in FIG. 7, the wearable control device 700 may include a control circuit 704 for controlling the functionality of the wearable control device 700. The control circuit 704 may include one or more general purpose processors, special purpose processors, conventional processors, digital signal processors (DSPs), microprocessors, integrated circuits, a programmable logic device (PLD), application specific integrated circuits (ASICs), or the like. The control circuit 704 may perform signal coding, data processing, power control, input/output processing, or any other functionality that enables the wearable control device 700 to perform as described herein.

The control circuit 704 may store information in and/or retrieve information from the memory 706. The memory 706 may include a non-removable memory and/or a removable memory. The non-removable memory may include random-access memory (RAM), read-only memory (ROM), a hard disk, or any other type of non-removable memory storage. The removable memory may include a subscriber identity module (SIM) card, a memory stick, a memory card, or any other type of removable memory.

The wearable control device 700 may communicate with other devices via a communication circuit 702. The wearable control device 700 may include one or more communication circuits 702 for communicating with different devices on different protocols and/or frequencies. For example, the communication circuits 702 may include a communication circuit configured to communicate with a central control device on a protocol or frequency and another communication circuit configured to communicate with a wireless communication device on another protocol or frequency.

The communication circuits 702 may be capable of performing wired and/or wireless communications. The communication circuits 702 may include a transmitter, receiver, and/or a transceiver. For example, the communication circuits 702 may include an RF transceiver for transmitting and receiving RF signals via an antenna or other communications module capable of performing wireless communications. The communication circuits 702 may be in communication with the control circuit 704. The communication circuits 702 may be capable of performing communications via different communication channels (e.g., communication protocols, communication frequencies, etc.). For example, the communication circuits 702 may be capable of communicating via WI-FI®, WIMAX®, BLUETOOTH®, near field communication (NFC), a proprietary communication protocol, such as CLEAR CONNECT™, ZIGBEE®, Z-WAVE, or the like. The communication circuits 702 may comprise an RF transmitter for transmitting RF signals, an RF receiver for receiving RF signals, an IR transmitter for transmitting IR signals, or an IR receiver for receiving IR signals.

The control circuit 704 may be in communication with an indicator light 712. The indicator light 712 may turn on and/or off to provide indications to a user, such as whether the wearable control device 700 is on or off, whether a gesture has been identified, whether the wearable control device 700 has been enabled or disabled, whether the wearable control device 700 is in a programming mode, or the like. The control circuit 704 may receive audio data via one or more microphones (not shown) for capturing audio and may store the audio data in memory 706.

The control circuit 704 may be in communication with a display 710 (e.g., a visual display, such as an LED display) for providing information to a user. The display 710 and the control circuit 704 may be in two-way communication, as the display 704 may include a touch screen module capable of receiving information from a user and providing such information to the control circuit 704.

The wearable control device 700 may include another input source 708 from which user inputs may be received at the control circuit 704. The input source 708 may include a keyboard or other buttons from which user inputs may be received. The input source 708 may include a biometric sensor. The biometric sensor may include, for example, a fingerprint scanner, an eye scanner, and a heart rate monitor capable of identifying heart rate information for a user. The input source may include a camera from which images may be received at the control circuit 704.

The wearable control device 700 may include one or more position determining circuits 714. The position determining circuit 714 may be capable of determining the position and/or movement of the wearable control device 700. Position determining circuit 714 may include a global positioning system (GPS) circuit, a gyroscope, and/or an accelerometer. The GPS circuit may be capable of receiving GPS information. The control circuit 704 may be capable of determining the GPS coordinates of the wearable control device 700 based on the GPS information received via the GPS circuit. The gyroscope may identify an orientation of the wearable control device 700. For example, the control circuit 704 may be capable of determining the orientation of the wearable control device 700 based on the orientation information received via the gyroscope. The accelerometer may identify an acceleration of the wearable control device 700. The accelerometer may be used (e.g., used by the control circuit 704) to detect magnitude and/or direction of the acceleration of the wearable control device 700, such as in the form of a vector, an orientation of the wearable control device 700, and/or vibrations of the wearable control device 700.

Each of the modules of the wearable control device 700 may be powered by a power source 716. The power source 716 may include, for example, DC power source, such as a battery. The power source 716 may generate a supply voltage $V_{CC}$ for powering the modules of the wearable control device 700.

Figure 8:
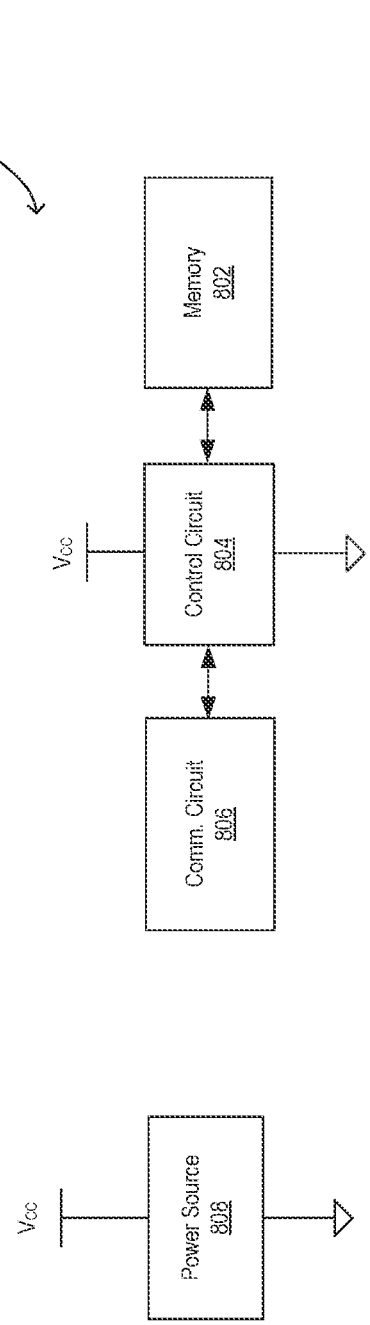
FIG. 8 is a block diagram depicting an example of a central control device.

FIG. 8 is a block diagram depicting an example central control device 800 (e.g., the central control device 230 shown in FIG. 2). As shown in FIG. 8, the central control device 800 may include a control circuit 804 for controlling the functionality of the central control device 800. The control circuit 804 may include one or more general purpose processors, special purpose processors, conventional processors, digital signal processors (DSPs), microprocessors, integrated circuits, a programmable logic device (PLD), application specific integrated circuits (ASICs), or the like. The control circuit 804 may perform signal coding, data processing, image processing, power control, input/output processing, or any other functionality that enables the central control device 800 to perform as described herein.

The control circuit 804 may store information in and/or retrieve information from the memory 802. The memory 802 may include a non-removable memory and/or a removable memory. The non-removable memory may include random-access memory (RAM), read-only memory (ROM), a hard disk, or any other type of non-removable memory storage. The removable memory may include a subscriber identity module (SIM) card, a memory stick, a memory card, or any other type of removable memory.

The central control device 800 may communicate with other devices via a communication circuit 806. The central control device 800 may include one or more communication circuits. For example, one communication circuit may communicate with a wearable control device and one communication circuit may communicate with a wireless communication device. The communication circuit 806 may be capable of performing wired and/or wireless communications. The communication circuit 806 may include a transmitter, a receiver, and/or a transceiver. For example, the communication circuit 806 may include an RF transceiver for transmitting and receiving RF signals via an antenna, or other communications module capable of performing wireless communications. The communication circuit 806 may be in communication with controller 804. The communication circuit 806 may be capable of performing communications via different communication channels. For example, the communication circuit 904 may be capable of communicating via WI-FI®, WIMAX®, BLUETOOTH®, near field communication (NFC), a proprietary communication protocol, such as CLEAR CONNECT™, ZIGBEE®, Z-WAVE, or the like.

Each of the modules of the central control device 800 may be powered by a power source 808. The power source 808 may include, for example, an AC power source or a DC power source, such as a battery. The power source 808 may generate a supply voltage $V_{CC}$ for powering the modules of the central control device 800.

Figure 9:
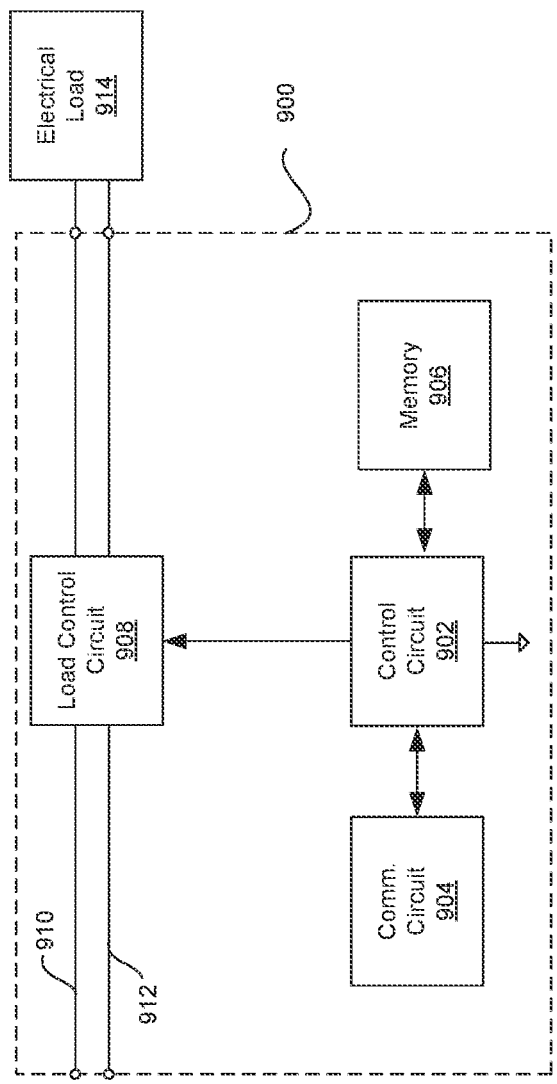
FIG. 9 is a block diagram depicting an example of a control-target device.

FIG. 9 is a block diagram depicting an example control-target device 900. The control-target device 900 may include a dimmer switch, an electronic switch, an electronic ballast for controlling fluorescent lamps, a light-emitting diode (LED) driver for controlling LED light sources, a plug-in control device (e.g., a switching device), a thermostat, a motorized window treatment, or other control-target device for controlling an electrical load 914. The control-target device 900 may include a control circuit 902 for controlling the functionality of the control-target device 900. The control circuit 902 may include one or more general purpose processors, special purpose processors, conventional processors, digital signal processors (DSPs), microprocessors, integrated circuits, a programmable logic device (PLD), application specific integrated circuits (ASICs), or the like. The control circuit 902 may perform signal coding, data processing, image processing, power control, input/output processing, or any other functionality that enables the control-target device 900 to perform as described herein.

The control-target device 900 may communicate with other devices via the communication circuit 904. The communication circuit 904 may be in communication with controller 902. The communication circuit 904 maybe capable of performing wired and/or wireless communications. The communication circuit 904 may include an RF transceiver for transmitting and receiving RF signals via an antenna, or other communications module capable of performing wired and/or wireless communications. For example, the communication circuit 904 may be capable of communicating via WI-FI®, WIMAX®, BLUETOOTH®, near field communication (NFC), a proprietary communication protocol, such as CLEAR CONNECT™, ZIGBEE®, Z-WAVE, or the like.

The control circuit 902 may store information in and/or retrieve information from the memory 906. The memory 906 may include a non-removable memory and/or a removable memory. A load control circuit 908 may receive instructions from the control circuit 902 and may control the electrical load 914 (e.g., by controlling the amount of power provided to the load) based on the received instructions. The load control circuit 908 may receive power via a hot connection 910 and a neutral connection 912. While the control-target device 900 includes four terminals as shown in FIG. 9, the control-target device 900 may include one load terminal connected to the electrical load 914, which may be connected in series between the control-target device 900 and a neutral of the AC power source supplying power to the hot connection 910 and the neutral connection 912. In other words, the control-target device 900 may be a "three-wire" device. The control-target device 900 may have one connection to the AC power source (e.g., hot connection 910) and may not comprise a connection to the neutral of the AC power source (e.g., may not comprise neutral connection 912). In other words, the control-target device 900 may be a "two-wire" device. The electrical load 914 may include any type of electrical load.

Figure 10:
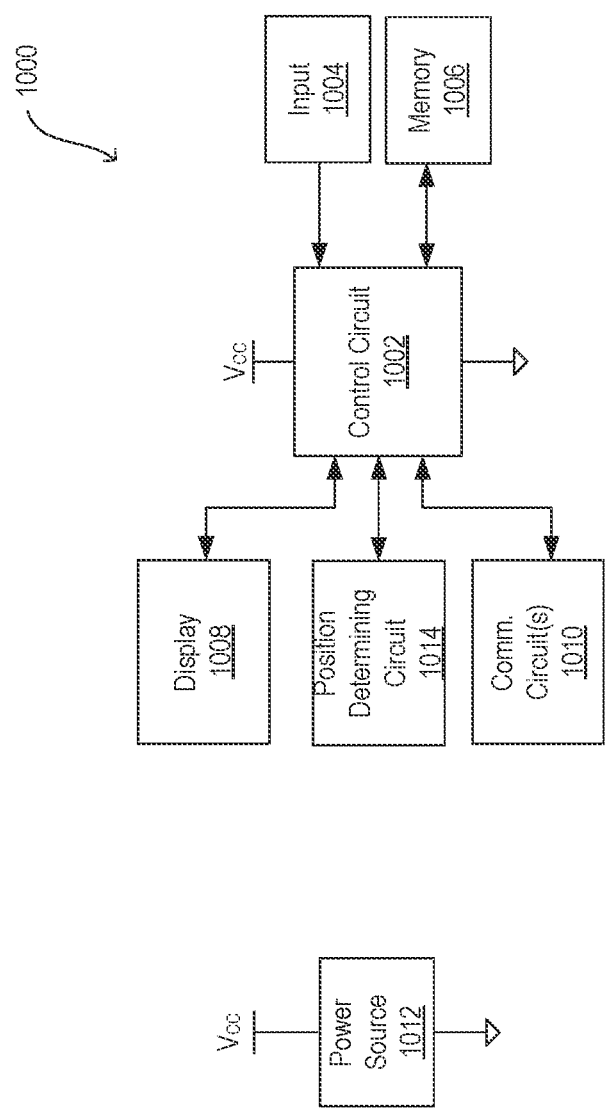
FIG. 10 is a block diagram depicting an example of a wireless communication device.

FIG. 10 is a block diagram illustrating an example wireless communication device 1000 (e.g., the wireless communication device 232 shown in FIG. 2). The wireless communication device 1000 may include a control circuit 1002 for controlling the functionality of the wireless communication device 1000. The control circuit 1002 may include one or more general purpose processors, special purpose processors, conventional processors, digital signal processors (DSPs), microprocessors, integrated circuits, a programmable logic device (PLD), application specific integrated circuits (ASICs), or the like. The control circuit 1002 may perform signal coding, data processing, power control, input/output processing, or any other functionality that enables the wireless communication device 1000 to perform as described herein.

The control circuit 1002 may store information in and/or retrieve information from a memory 1006. The memory 1006 may include a non-removable memory and/or a removable memory. The non-removable memory may include random-access memory (RAM), read-only memory (ROM), a hard disk, or any other type of non-removable memory storage. The removable memory may include a subscriber identity module (SIM) card, a memory stick, a memory card, or any other type of removable memory.

The wireless communication device 1000 may include one or more communication circuits 1010 for transmitting and/or receiving information from other devices. For example, the communication circuits 1010 may include a communication circuit configured to communicate with a central control device on a protocol or frequency and another communication circuit configured to communicate with a wireless communication device on another protocol or frequency. The communication circuits 1010 may perform wireless or wired communications. Communication circuits 1010 may be in communication with control circuit 1002 for transmitting and/or receiving information. The communication circuits 1010 may include a transmitter, receiver, and/or a transceiver. For example, the communication circuits 1010 may include an RF transceiver for transmitting and receiving RF signals via an antenna, or other communications module capable of performing wired and/or wireless communications. For example, the communication circuits 1010 may be capable of communicating via WI-FI®, WIMAX®, BLUETOOTH®, cellular communication, near field communication (NFC), a proprietary communication protocol, such as CLEAR CONNECT™, ZIGBEE®, Z-WAVE, or the like.

The control circuit 1002 may be in communication with a display 1008 (e.g., a visual display, such as an LED display) for providing information to a user. The display 1008 and the control circuit 1002 may be in two-way communication, as the display 1008 may include a touch screen module capable of receiving information from a user and providing such information to the control circuit 1002. The wireless communication device 1000 may include another input source 1004, such as a keyboard or other buttons, from which user inputs may be received at the control circuit 1002.

The wireless communication device 1000 may include one or more position determining circuits 1014. The position determining circuit 1014 may be capable of determining the position and/or movement of the wireless communication device 1000. Position determining circuit 1014 may include a global positioning system (GPS) circuit, a gyroscope, and/or an accelerometer. The GPS circuit may be capable of receiving GPS information. The control circuit 1002 may be capable of determining the GPS coordinates of the wireless communication device 1000 based on the GPS information received via the GPS circuit. The gyroscope may identify an orientation of the wireless communication device 1000. For example, the control circuit 1002 may be capable of determining the orientation of the wireless communication device 1000 based on the orientation information received via the gyroscope. The accelerometer may identify an acceleration of the wireless communication device 1000. The accelerometer may be used (e.g., used by the control circuit 1002) to detect magnitude and/or direction of the acceleration of the wireless communication device 1000, such as in the form of a vector, an orientation of the wireless communication device 1000, and/or vibrations of the wireless communication device 1000.

Each of the modules of the wireless communication device 1000 may be powered by a power source 1012. The power source 1012 may include an AC power supply or DC power supply, for example. The power source 1012 may generate a supply voltage $V_{CC}$ for powering the modules within the wireless communication device 1000.

Although features and elements are described above in particular combinations, each feature or element can be used alone or in any combination with the other features and elements. The methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), removable disks, and optical media such as CD-ROM disks, and digital versatile disks (DVDs).

The invention claimed is:

1. An electrical load controller, comprising:
   first communications interface circuitry;
   second communications interface circuitry;
   electrical load device control circuitry communicatively coupled to the first communications interface circuitry and to the second communications interface circuitry, the electrical load device control circuitry to:
   receive, from a wearable device via the first communications interface circuitry and using a first communication protocol, a first input that includes data representative of a gesture provided by a user of the wearable device;
   receive, via the first communications interface circuitry, a second input provided by the user of the wearable device;
   responsive to the receipt of the first input and the second input:
   using either of the first input or the second input, identify a plurality of electric load devices communicatively coupled to the electrical load controller via the second communication interface circuitry;
   wherein the plurality of electric load devices include: one or more control-source devices and one or more control-target devices;
   using the remaining one of either the first input or the second input, identify one or more instructions associated with at least one of the identified plurality of electric load devices;
   generate one or more commands that include at least one of the one or more instructions;
   cause a communication, via the second communications interface circuitry using a second communication protocol different than the first communication protocol, of the generated one or more commands to the at least one of the identified plurality of electric load devices.

2. The electrical load controller of claim 1 wherein the second input comprises data representative of a second gesture provided by the user of the wearable device, the second gesture distinct from the first gesture provided by the user of the wearable device.

3. The electrical load controller of claim 1 wherein the second input comprises data representative of a tactile input provided by the user of the wearable device.

4. The electrical load controller of claim 1 wherein the second input comprises data representative of an audio input provided by the user of the wearable device.

5. The electrical load controller of claim 1 wherein the gesture data includes the data indicative of the at least one of the identified plurality of electric load devices and the second input includes data indicative of the one or more instructions.

6. The electrical load controller of claim 1 wherein the second input includes data indicative of the at least one of the identified plurality of electric load devices and the gesture data includes the data indicative of one or more instructions.

7. The electrical load controller of claim 1 wherein to identify the plurality of electric load devices and to identify the one or more instructions associated with the at least one of the identified plurality of electric load devices, the control circuitry to perform one or more lookup operations using a datastore at least partially resident in the wearable device.

8. The electrical load controller of claim 1 wherein to identify the plurality of electric load devices and to identify the one or more instructions associated with the at least one of the identified plurality of electric load devices, the control circuitry to perform one or more lookup operations using a datastore at least partially resident in a communicatively coupled network device.

9. An electrical load control method, comprising:
   receiving, by electrical load device control circuitry from a wearable device via first communication interface circuitry using a first communication protocol, a first input that includes data representative of a gesture provided by a user of the wearable device;
   receiving, by the electrical load device control circuitry via the first communication interface circuitry, a second input provided by the user of the wearable device;
   responsive to the receipt of the first input and the second input:
   identifying, by the electrical load device control circuitry, a plurality of electric load devices using either of the first input or the second input;
   identifying, by the electrical load device control circuitry, one or more instructions associated with at least one of the identified plurality of electric load devices using the remaining one of either the first input or the second input, wherein the plurality of electric load devices include: one or more control-source devices and one or more control-target devices;
   generating, by the electrical load device control circuitry, one or more commands that include at least one of the one or more instructions;
   causing, by the electrical load device control circuitry via second communication interface circuitry using a second communication protocol, a communication of the generated one or more commands to the at least one of the identified plurality of electric load devices.

10. The electrical load control method of claim 9 wherein receiving, via the first communication interface circuitry, the second input provided by the user of the wearable device further comprises:
receiving, by the electrical load device control circuitry via the first communication interface circuitry, data representative of a second gesture provided by the user of the wearable device, wherein the second gesture differs from the first gesture provided by the user of the wearable device.

11. The electrical load control method of claim 9 wherein receiving, via the first communication interface circuitry, the second input provided by the user of the wearable device further comprises:
receiving, by the electrical load device control circuitry via the first communication interface circuitry, data representative of a tactile input provided by the user of the wearable device.

12. The electrical load control method of claim 9 wherein receiving, via the first communication interface circuitry, the second input provided by the user of the wearable device further comprises:
receiving, by the electrical load device control circuitry via the first communication interface circuitry, data representative of an audio input provided by the user of the wearable device.

13. The electrical load control method of claim 9:
wherein receiving, via the first communication interface circuitry, the first input that includes the data representative of the gesture provided by the user of the wearable device further comprises:
receiving, by the electrical load device control circuitry via the first communication interface circuitry, gesture data that includes data indicative of the plurality of electric load devices; and
wherein receiving, via the first communication interface circuitry, the second input provided by the user of the wearable device further comprises:
receiving, by the electrical load device control circuitry via the first communication interface circuitry, data indicative of the one or more instructions associated with the at least one of the identified plurality of electric load devices.

14. The electrical load control method of claim 9:
wherein receiving, via the first communication interface circuitry, the second input provided by the user of the wearable device further comprises:
receiving, by the electrical load device control circuitry via the first communication interface circuitry, data indicative of the plurality of electric load devices; and
wherein receiving, via the first communication interface circuitry, the first input that includes the data representative of the gesture provided by the user of the wearable device further comprises:
receiving, by the electrical load device control circuitry via the first communication interface circuitry, gesture data includes the data indicative of one or more instructions associated with the at least one of the identified plurality of electric load devices.

15. The electrical load control method of claim 9 wherein identifying the plurality of electric load devices and identifying the one or more instructions associated with the at least one of the identified plurality of electric load devices further comprises:
performing, by the electrical load device control circuitry, one or more lookup operations using a datastore at least partially resident in the wearable device.

16. The electrical load control method of claim 9 wherein identifying the plurality of electric load devices and identifying the one or more instructions associated with the at least one of the identified plurality of electric load devices further comprises:
performing, by the electrical load device control circuitry, one or more lookup operations using a datastore at least partially resident in a communicatively coupled network device.

17. A non-transitory, machine-readable, storage device that includes instructions that, when executed by electrical load device control circuitry, causes the electrical load device control circuitry to:
receive, from a wearable device via first communication interface circuitry using a first communication protocol, a first input that includes data representative of a gesture provided by a user of the wearable device;
receive from a wearable device via first communication interface circuitry, a second input provided by the user of the wearable device;
responsive to the receipt of the first input and the second input:
identify a plurality of electric load devices using either of the first input or the second input, wherein the plurality of electric load devices include: one or more control-source devices and one or more control-target devices;
identify one or more instructions associated with at least one of the identified plurality of electric load devices using the remaining one of either the first input or the second input;
generate one or more commands that include at least one of the one or more instructions;
cause a communication via second communication interface circuitry using a second communication protocol of the generated one or more commands to the at least one of the identified plurality of electric load devices.

18. The non-transitory, machine-readable, storage device of claim 17 wherein the instructions that cause the electrical load device control circuitry to receive, via the first communication interface circuitry, the second input provided by the user of the wearable device further cause the electrical load device control circuitry to:
receive, via the first communication interface circuitry, a second input that includes data representative of a second gesture provided by the user of the wearable device, wherein the second gesture differs from the first gesture provided by the user of the wearable device.

19. The non-transitory, machine-readable, storage device of claim 17 wherein the instructions that cause the electrical load device control circuitry to receive, via the first communication interface circuitry, the second input provided by the user of the wearable device further cause the electrical load device control circuitry to:
receive, via the first communication interface circuitry, a second input that includes data representative of a tactile input provided by the user of the wearable device.

20. The non-transitory, machine-readable, storage device of claim 17 wherein the instructions that cause the electrical load device control circuitry to receive, via the first communication interface circuitry, the second input provided by the user of the wearable device further cause the electrical load device control circuitry to:

receive, via the first communication interface circuitry, a second input that includes data representative of an audio input provided by the user of the wearable device.

21. The non-transitory, machine-readable, storage device of claim 17:
wherein the instructions that cause the electrical load device control circuitry to receive, via the first communication interface circuitry, the first input that includes the data representative of the gesture provided by the user of the wearable device further cause the electrical load device control circuitry to:
receive, as the first input, gesture data that includes data indicative of the plurality of electric load devices; and
wherein the instructions that cause the electrical load device control circuitry to receive the second input provided by the user of the wearable device further cause the electrical load device control circuitry to:
receive, as the second input, data indicative of the one or more instructions associated with the at least one of the identified plurality of electric load devices.

22. The non-transitory, machine-readable, storage device of claim 17:
wherein the instructions that cause the electrical load device control circuitry to receive, via the first communication interface circuitry, the second input provided by the user of the wearable device further cause the electrical load device control circuitry to:
receive, as the second input, data indicative of the plurality of electric load devices; and
wherein the instructions that cause the electrical load device control circuitry to receive, via the first communication interface circuitry, the first input that includes the data representative of the gesture provided by the user of the wearable device further cause the electrical load device control circuitry to:
receive, as the first input, gesture data includes the data indicative of one or more instructions associated with the at least one of the identified plurality of electric load devices.

23. The non-transitory, machine-readable, storage device of claim 17 wherein the instructions that cause the electrical load device control circuitry to identify the plurality of electric load devices and to identify the one or more instructions associated with the identified plurality of electric load devices further cause the electrical load device control circuitry to:
perform one or more lookup operations using a datastore at least partially resident in the wearable device.

24. The non-transitory, machine-readable, storage device of claim 17 wherein the instructions that cause the electrical load device control circuitry to identify the plurality of electric load devices and to identify the one or more instructions associated with the identified plurality of electric load devices further cause the electrical load device control circuitry to:
perform one or more lookup operations using a datastore at least partially resident in a network device communicatively coupled to the wearable device.

* * * * *